(12) United States Patent
Aingaran et al.

(10) Patent No.: US 9,571,408 B2
(45) Date of Patent: Feb. 14, 2017

(54) DYNAMIC FLOW CONTROL USING CREDIT SHARING

(71) Applicant: Oracle International Corporation, Redwood Shores, CA (US)

(72) Inventors: Kathirgamar Aingaran, Mountain View, CA (US); Manling Yang, Santa Clara, CA (US); David Richard Smentek, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 14/638,953

(22) Filed: Mar. 4, 2015

(65) Prior Publication Data

US 2016/0261513 A1    Sep. 8, 2016

(51) Int. Cl.
*H04L 12/835* (2013.01)
*H04L 12/925* (2013.01)
*H04L 12/933* (2013.01)

(52) U.S. Cl.
CPC ............. *H04L 47/30* (2013.01); *H04L 47/722* (2013.01); *H04L 49/102* (2013.01)

(58) Field of Classification Search
None
See application file for complete search history.

(56) References Cited

U.S. PATENT DOCUMENTS

| | | | | |
|---|---|---|---|---|
| 6,594,701 B1 * | 7/2003 | Forin | ................... | G06F 12/1081 707/E17.036 |
| 6,674,722 B1 * | 1/2004 | Tiainen | ............... | H04L 12/5602 370/236 |
| 9,426,083 B2 * | 8/2016 | Ziegler | ................. | H04L 49/505 |
| 2002/0055993 A1 * | 5/2002 | Shah | ...................... | H04L 47/10 709/223 |
| 2007/0133415 A1 * | 6/2007 | Spink | ...................... | H04L 47/10 370/235 |

(Continued)

OTHER PUBLICATIONS

Kung, H. T., "Credit-Based Flow Control for ATM Networks: Credit Update Protocol, Adaptive Credit Allocation, and Statistical Multiplexing", Proceedings of the ACM SIGCOMM '94 Symposium on Communications Architectures, Protocols and Applications 1994, pp. 101-114 (14 pages).

(Continued)

*Primary Examiner* — Eunsook Choi
(74) *Attorney, Agent, or Firm* — Osha Liang LLP

(57) ABSTRACT

A method and system for dynamic flow control using credit sharing that includes allocating portions of credits to senders, wherein each of the credits is for communicating with a receiver; transmitting, by a first sender of the senders, a first message to the receiver using a first credit of a first portion of the credits; decrementing, in response to transmitting the first message, a credit balance of the first sender by one; and determining that the credit balance of the first sender is zero. The method also includes sending to a second sender of the senders, by the first sender, in response to the credit balance being zero, a first request for a second credit; receiving from the second sender, in response to the first request, a first response comprising the second credit; and transmitting, by the first sender, a second message to the receiver using the second credit.

20 Claims, 18 Drawing Sheets

(56) References Cited

U.S. PATENT DOCUMENTS

2012/0066407 A1* 3/2012 Andries ............. H04L 41/5009
709/232
2014/0307555 A1* 10/2014 DeCusatis ............... H04L 47/39
370/236

OTHER PUBLICATIONS

Jun, Do-Sung, "Credit-Based Processor Sharing for Decoupled Delay and Bandwidth Allocation", IEEE Communications Letters, vol. 5, No. 4, Apr. 2001 (3 pages).
Katevenis, Manolis, "Buffer Requirements of Credit-Based Flow Control when a Minimum Draining Rate is Guaranteed", 4th IEEE Workshop on Architecture & Implementation of High Performance Communication Subsystems; Chalkidiki, Greece, Jun. 1997 (11 pages).

* cited by examiner

DYNAMIC FLOW CONTROL USING CREDIT SHARING

BACKGROUND

Entities (e.g., devices and/or components of devices) need to communicate with one another at times. Often some form of flow control is implemented on the communication in order to regulate the rate of data transmission. One form of flow control is credit-based flow control, in which senders must use a credit in order to transmit data to a receiver. Credit-based flow control schemes generally include a pool of credits associated with a receiver that are statically partitioned across a group of senders. Receivers in a credit-based flow control scheme include units of storage (e.g., buffer slots) that have a one-to-one correspondence with the total quantity of credits in the pool. Credit-based flow control ensures that when data is transmitted by a sender, there is always an available storage location at the receiver, such that no back-pressure occurs.

SUMMARY

In general, in one aspect, the invention relates to a method of dynamic flow control using credit sharing that includes allocating portions of a plurality of credits to each of a plurality of senders, wherein each of the plurality of credits is for communicating with a receiver; transmitting, by a first sender of the plurality of senders, a first message to the receiver using a first credit of a first portion of the plurality of credits; decrementing, in response to transmitting the first message, a credit balance of the first sender by one; and determining that the credit balance of the first sender is zero. The method also includes sending to a second sender of the plurality of senders, by the first sender, in response to the credit balance being zero, a first request for a second credit; receiving from the second sender, in response to the first request, a first response comprising the second credit; and transmitting, by the first sender, a second message to the receiver using the second credit.

In general, in one aspect, the invention relates to a system for dynamic flow control using credit sharing that includes a receiver comprising a buffer comprising a plurality of buffer slots for storing messages; a plurality of credits corresponding to the plurality of buffer slots; a first sender operatively connected to the receiver and configured to receive an allocation of a first portion of the plurality of credits; and a second sender operatively connected to the receiver and the first sender. The second sender includes functionality to receive an allocation of a second portion of the plurality of credits; transmit a first message to the receiver using a first credit of the second portion; decrement, in response to transmitting the first message, a credit balance of the second sender; determine that the credit balance of the second sender is zero; send, in response to the credit balance being zero, a first request to the first sender for a second credit; receive, in response to the first request, a first response from the first sender comprising the second credit; and transmit a second message to the receiver using the second credit. The system also includes a sender network operatively connecting the first sender and the second sender.

In general, in one aspect, the invention relates to a system for dynamic flow control using credit sharing that includes a first receiver comprising a first buffer storing a first message; a second receiver comprising a second buffer storing a second message; and a first sender. The first sender includes a first counter storing a credit balance for the first receiver, where the first counter decrements in response to the first sender sending the first message to the first receiver, and a second counter storing a credit balance for the second receiver, where the second counter decrements in response to the first sender sending the second message to the second receiver. The system also includes a second sender operatively connected to the first receiver and the second receiver and configured to give a plurality of credits for the first receiver to the first sender. Additionally, the system includes a sender network for sharing the plurality of credits between the second sender and the first sender. The first counter increments in response to the first sender receiving the plurality of credits.

Other aspects of the invention will be apparent from the following description and the appended claims.

DETAILED DESCRIPTION

Figure 1:
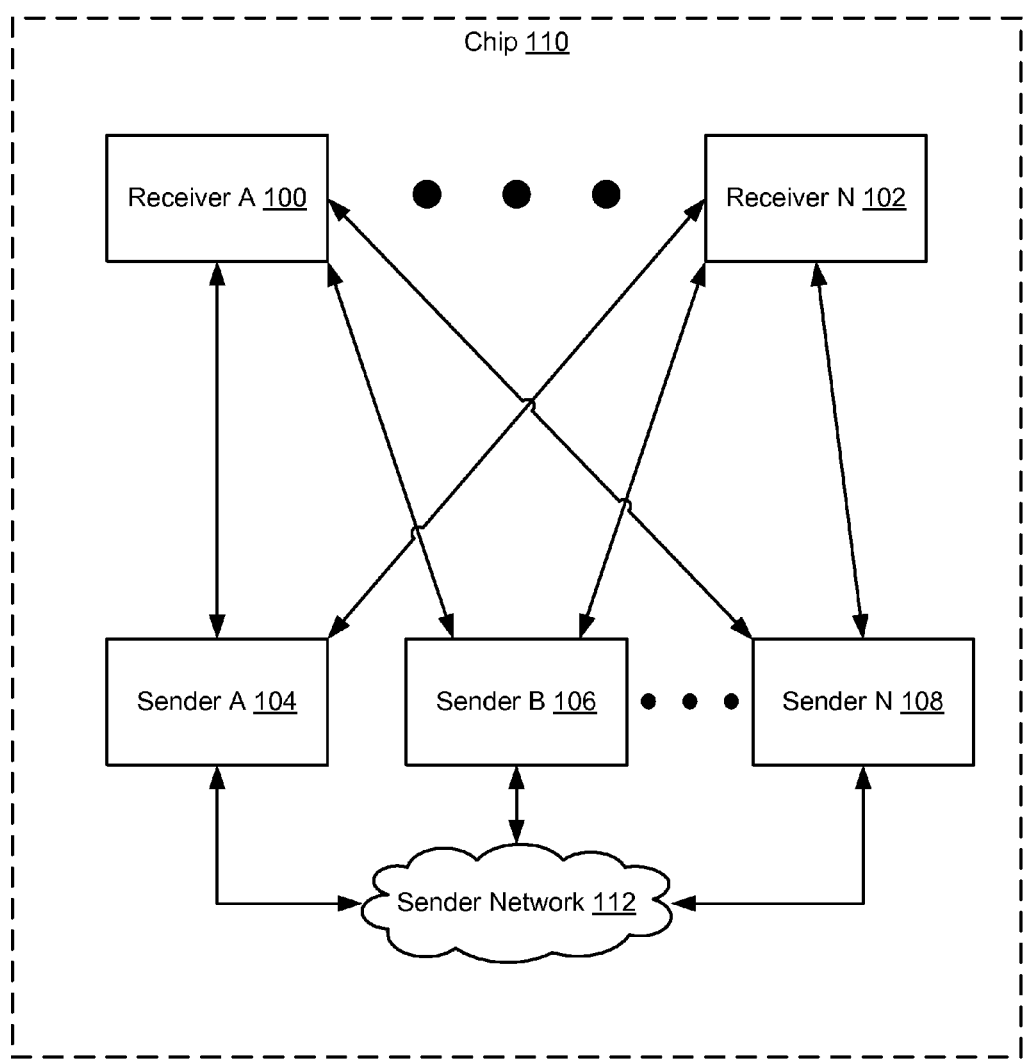
FIG. 1 shows a system in accordance with one or more embodiments of the invention.

Specific embodiments of the invention will now be described in detail with reference to the accompanying figures. Like elements in the various figures may be denoted by like reference numerals and/or like names for consistency.

In the following detailed description of one or more embodiments of the invention, numerous specific details are set forth in order to provide a more thorough understanding. However, it will be apparent to one of ordinary skill in the art that embodiments of the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention provide a method and system for sharing between senders one or more credits associated with a receiver. Specifically, in one or more embodiments of the invention, a receiver includes a number of buffer slots that is equivalent to a number of credits associated with the receiver. In one or more embodiments of the invention, each sender that is operatively connected to the receiver uses the credits to communicate with the receiver. However, the senders may not all be in communication with the receiver concurrently. Accordingly, the senders may include functionality to share one or more credits with other senders. In one or more embodiments of the invention, the ability to share credits reduces the number of buffer slots needed in the receiver as the total number of credits available to senders is reduced.

FIG. 1 shows a system in accordance with one or more embodiments of the invention. As shown in system 1, the system includes one or more receivers (e.g., receiver A (100), receiver N (102)), and one or more senders (e.g., sender A (104), sender B (106), sender N (108)). A sender may be operatively connected to other senders via a sender network (112). The senders and receivers may be components co-located on a chip (110). Each of the aforementioned components is described below.

The system may include any number of senders (e.g., sender A (104), sender B (106), sender N (108)). In one or more embodiments of the invention, each sender is operatively connected to one or more receivers (e.g., receiver A (100), receiver N (102)). In one or more embodiments of the invention, a sender (e.g., sender A (104), sender B (106), sender N (108)) is any hardware, software, firmware, and/or any combination thereof capable of sending data (e.g., messages). In one or more embodiments of the invention, a sender is any component and/or combination of components of an integrated circuit (i.e., chip (110)). Examples of a sender may include, but are not limited to: an accelerator for data analytics, a graphics processing unit (GPU), and/or an agent executing on a chip (110). A sender (e.g., sender A (104), sender B (106), sender N (108)) may include one or more credit balances (not shown), each associated with a given receiver operatively connected to the sender. In one or more embodiments of the invention, a sender includes functionality to send messages to one or more receivers. Senders are discussed further in the description of FIG. 2, below.

The system may include any number of receivers (e.g., receiver A (100), receiver N (102)). In one or more embodiments of the invention, each receiver (e.g., receiver A (100), receiver N (102)) is operatively connected to one or more senders (e.g., sender A (104), sender B (106), sender N (108)). For example, one or more receivers (e.g., receiver A (100), receiver N (102)) may be operatively connected to one or more senders via a network on a chip (NOC). A NOC is a subsystem of an integrated circuit that provides channel to various components of the integrated circuit through which they may communicate with one another. In one or more embodiments of the invention, a receiver (e.g., receiver A (100), receiver N (102)) is any hardware, software, firmware, and/or any combination thereof capable of receiving messages. As used herein, the term message refers to any unit of data (e.g., packet, frame, character string, transaction etc.). A receiver (e.g., receiver A (100), receiver N (102)) may be any component and/or combination of components of an integrated circuit (i.e., chip (110)). For example, a receiver (e.g., receiver A (100), receiver N (102)) may be a combination of a processing core and associated cache (i.e., a core/cache combination). A receiver (e.g., receiver A (100), receiver N (102)) may include one or more buffers (not shown) for storing messages received from senders. In one or more embodiments of the invention, a receiver (e.g., receiver A (100), receiver N (102)) includes functionality to receive messages from senders. Receivers are discussed further in the description of FIG. 3, below.

In one or more embodiments of the invention, each sender (e.g., sender A (104), sender B (106), sender N (108)) is operatively connected to one or more other senders via a sender network (112). In one or more embodiments of the invention, a sender network (112) is any suitable network that facilitates the exchange of data (e.g., credit requests, responses) from one part of the network to another. For example, the sender network (112) may be a unidirectional or bidirectional ring network that connects each sender to two other senders, each of which is, in turn, connected to an additional sender, such that the senders form a ring. In such an example, the sender network (112) may be a fabricated part of the chip (110) of which the senders and receivers are components. As another example, each sender (e.g., sender A (104), sender B (106), sender N (108)) may be connected to a number of other senders via a hub to which each of the senders is operatively connected.

In one or more embodiments of the invention, the receivers (e.g., receiver A (100), receiver N (102)), the senders ((e.g., sender A (104), sender B (106), sender N (108))), connections between receivers and senders, and the sender network (112) are included with a chip (110). In one or more embodiments of the invention, a chip (110) is an integrated circuit. For example, the chip may be an integrated circuit implemented using a semiconductor material, such as a portion of a silicon wafer. A chip (112) may include, but is not limited to, one or more processing cores (not shown), one or more registers, one or more caches, one or more counters, one or more accelerators, and/or any number of links between components.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, all components may not be co-located one the same chip, or within the same device. As another example, there may be more than one sender network, each connecting a different group of senders. Accordingly, embodiments of the invention should not be considered limited to the specific arrangements of components, modules, and/or elements shown in FIG. 1.

Figure 2:
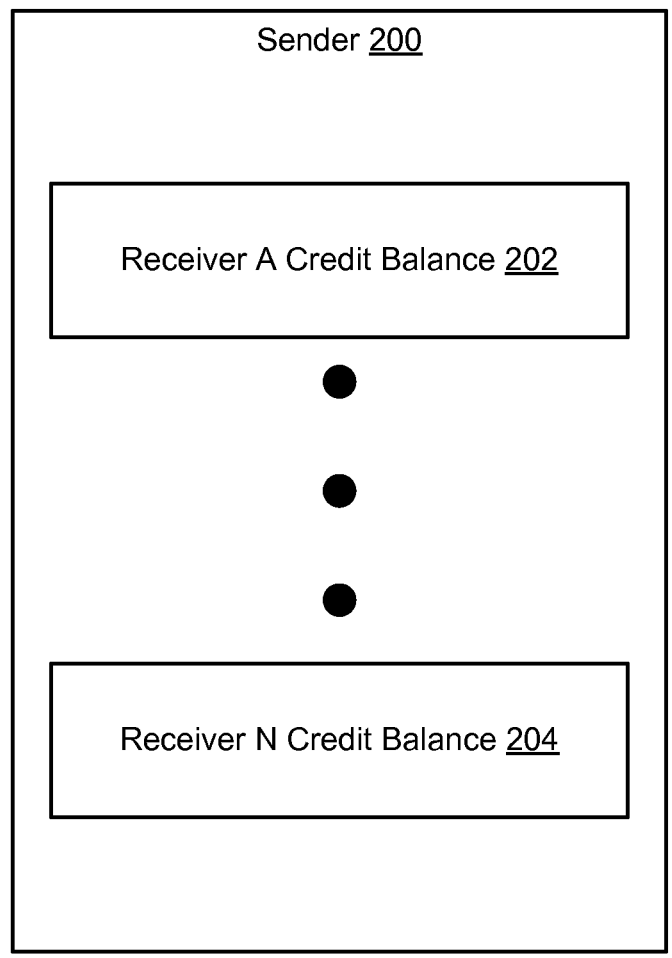
FIG. 2 shows an exemplary sender in accordance with one or more embodiments of the invention.

FIG. 2 shows an exemplary sender (200) in accordance with one or more embodiments of the invention. In other words, sender (200) may be essentially the same as any of the senders (104, 106, 108) discussed above in reference to FIG. 1. In one or more embodiments of the invention, as mentioned above, a sender (200) is a component that includes functionality to send messages (e.g., data) to a receiver (e.g., receiver A (100) of FIG. 1). To that end, in one or more embodiments of the invention, the sender (200) includes one or more credit balances (e.g., credit balance A (202), credit balance N (204)), each associated with one receiver to which the sender is operatively connected.

In one or more embodiments of the invention, a credit balance (e.g., credit balance A (202), credit balance N (204)) is the quantity of credits available for use by a sender to communicate with a receiver. In one or more embodiments of the invention, each credit (not shown) provides the sender (200) with the capability to send a message to a receiver. For example, Receiver A Credit Balance (202) is the number of credits available to sender (200) for transmission to Receiver 1 (not shown). Similarly, Receiver N Credit Balance (204) is the number of credits available to sender (200) for transmission to Receiver N (not shown).

If a NOC (not shown) connects the sender (200) to a receiver, then each credit may allow the sender (200) to send a specified number of packets (e.g., one) to the receiver. In one or more embodiments of the invention, a credit balance of a sender is decremented when the sender uses a credit to send a message to a receiver. In one or more embodiments of the invention, when a sender receives credits (e.g., returned from receiver after message is processed, from another sender, etc.), the credit balance of the sender (200) is incremented.

In one or more embodiments, each credit balance (e.g., 202, 204) is stored in a counter. Additionally or alternatively, two or more senders may share a counter for a given receiver when proximate to one another. In one or more embodiments of the invention, a credit may be used to transmit any type of data to a receiver. In other embodiments of the invention, different types of credits may be used to transmit different types of data. For example, a portion of the credits may be designated for use in relation to write requests, while another portion of the credits may be designated for use with read operations.

In one or more embodiments of the invention, each sender operatively connected to a receiver includes a credit balance (e.g., 202, 204) for the receiver. The credit balance may range from zero to the total number of buffer slots in the receiver. As discussed above, each sender has a credit balance for the receiver. The sum total of these credit balances equals the total number of buffer slots in the receiver. In one or more embodiments of the invention, the use of credits implements a form of flow control between receivers and senders.

While FIG. 2 shows a configuration of components, other configurations may be used without departing from the scope of the invention. For example, various components (e.g., credit balances) may be combined to create a single component. As another example, the functionality performed by a single component may be performed by two or more components. In one or more embodiments of the invention, one or more of the modules and elements shown in FIG. 2 may be omitted, repeated, and/or substituted. As an example, credit balances may be stored in counters that are operatively connected to a sender rather than included as a part of the sender. As another example, senders may include any number of other modules, components, sub-components, etc., according to the function of the sender. Accordingly, embodiments of the invention should not be considered limited to the specific arrangements of components, modules, and/or elements shown in FIG. 2.

Figure 3:
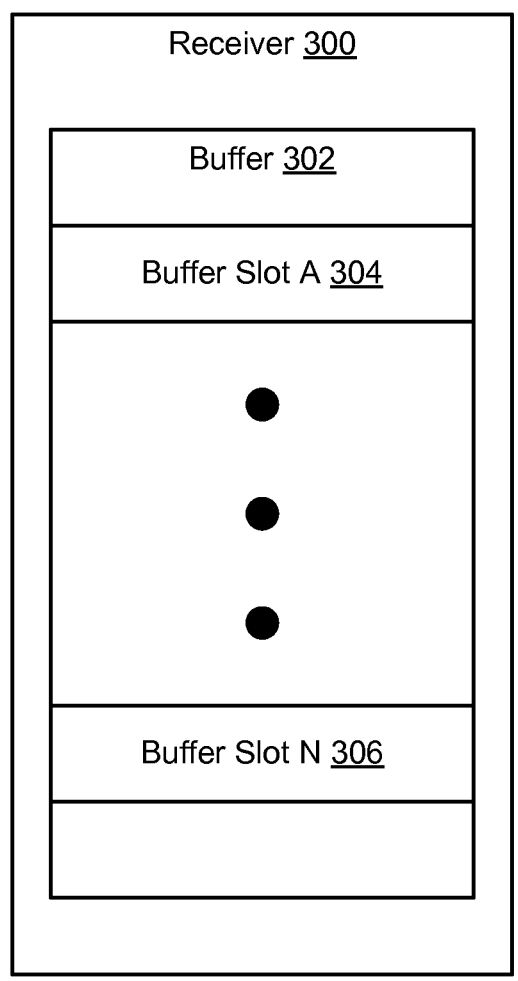
FIG. 3 shows an exemplary receiver in accordance with one or more embodiments of the invention.

FIG. 3 shows a receiver (300) in accordance with one or more embodiments of the invention. The receiver (300) may be essentially the same as any of the receivers (100, 102) discussed above in reference to FIG. 1. In one or more embodiments of the invention, as mentioned above, the receiver (300) is a component that includes functionality to receive data (i.e., messages) from a sender and process the data. To that end, in one or more embodiments of the invention, the receiver (300) includes one or more buffers (e.g., buffer (302)), each of which includes one or more buffer slots (e.g., buffer slot A (304), buffer slot N (306)).

In one or more embodiments of the invention, a buffer (302) is physical storage space for at least temporarily storing data. For example, a buffer (302) may be implemented as a region for storing data included as a part of, and/or operatively connected to, an integrated circuit. In one or more embodiments of the invention, a buffer includes one or more buffer slots (e.g., buffer slot A (304), buffer slot N (306)). In one or more embodiments of the invention, a buffer slot (e.g., buffer slot A (304), buffer slot N (306)) is a sub-region of the buffer (302) for storing up to a specified amount of data (e.g., a message received from a sender). In one or more embodiments of the invention, the number of buffer slots (e.g., buffer slot A (304), buffer slot N (306)) of the receiver (300) is equivalent to a total number of credits available to senders (e.g., sender A (104) of FIG. 1) operatively connected to the receiver (300).

In one or more embodiments of the invention, there are multiple buffers, each allocated for any number of senders. For example, the receiver (300) may include one buffer (302) and the buffer may include at least one buffer slot (e.g., buffer slot A (304), buffer slot N (306)) for each of the credits available to senders communicating with the receiver. In one or more embodiments of the invention, the receiver (300) is configured to return credits to senders once a buffer slot has been freed (e.g., the message in a buffer slot has been processed by the receiver).

While FIG. 3 shows a configuration of components, other configurations may be used without departing from the scope of the invention. In one or more embodiments of the invention, one or more of the modules and elements shown in FIG. 3 may be omitted, repeated, and/or substituted. As an example, the receiver may include any number of buffers. As another example, receivers may include any number of other modules, components, sub-components, etc., according to the function of the receiver. As still another example, the one or more buffers may be operatively connected to the receiver rather than included as a part of the receiver. Accordingly, embodiments of the invention should not be considered limited to the specific arrangements of components, modules, and/or elements shown in FIG. 3.

Figure 4A:
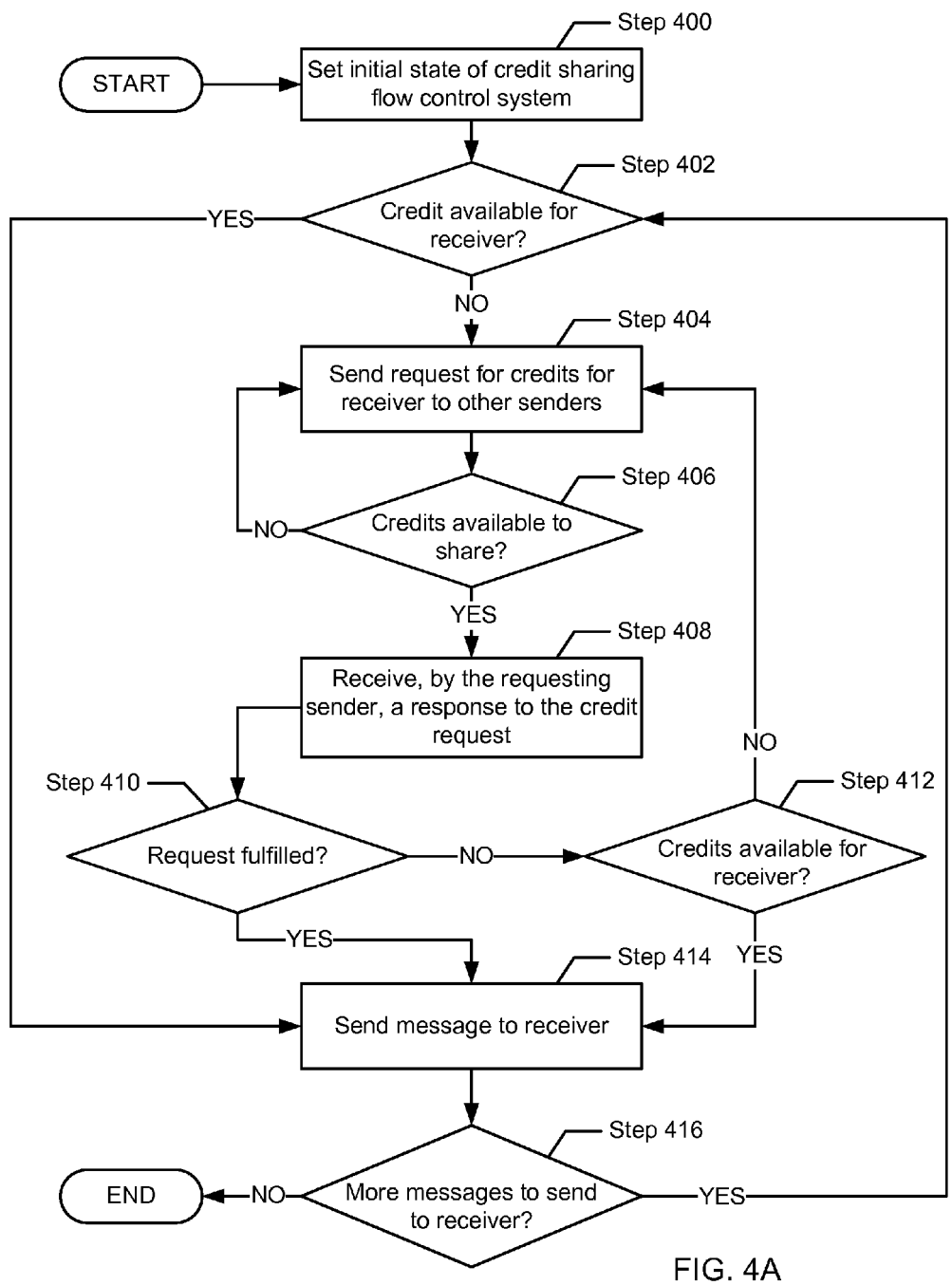
FIGS. 4A and 4B show flowcharts in accordance with one or more embodiments of the invention.
Figure 4B:
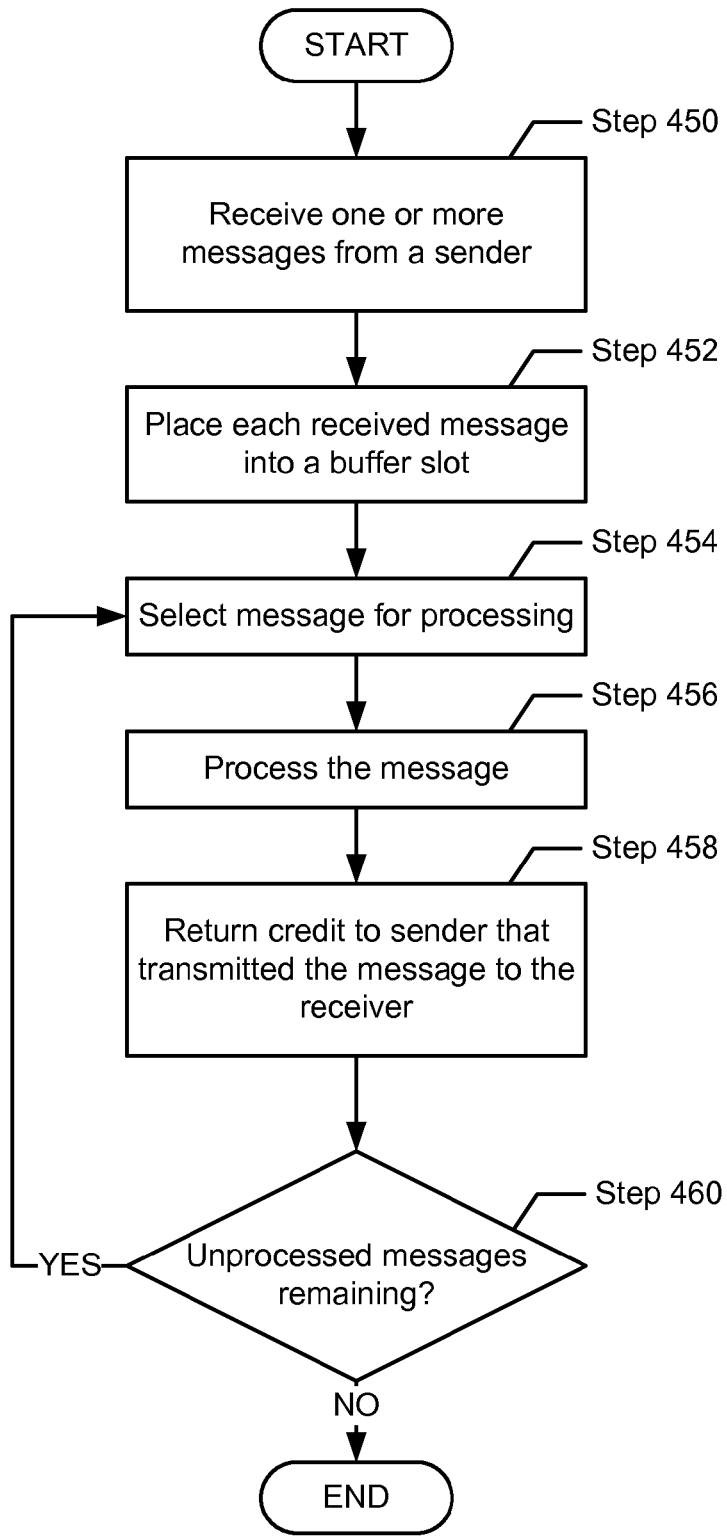

FIGS. 4A and 4B show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. By way of an example, determination steps may not require a computer processor to process an instruction unless an interrupt is received to signify that condition exists in accordance with one or more embodiments of the invention.

FIG. 4A shows a flowchart describing a method for sharing credits between senders in accordance with one or more embodiments of the invention. In Step 400, an initial state of a credit exchange flow control system is set. In one or more embodiments of the invention, setting the initial state of the system includes allocating a portion of a total number of credits associated with a receiver to each of the senders. In other words, each sender operatively connected to the receiver may get a portion of the total number of credits. For example, the senders may each get the same number of credits (i.e., the credits may be equally divided among the senders). Additionally or alternatively, each sender may have a sender rank (i.e., a priority) and the credits may be divided among the multiple sender based on sender rank (e.g., the sender with the highest sender rank gets the most credits, the sender with the lowest sender rank get the fewest credits). In one or more embodiments of the invention, the total number of credits is equivalent to a total number of buffer slots in one or more buffers of the receiver. A portion of the total quantity of credits may be allocated to the senders via any method of credit distribution. For example, a quantity may be set in a credit balance counter of each sender each time a system is powered on. As another example, the system may include functionality to reset the credit balance counter of a sender to the initial state while the system is running.

In Step 402, in order to transmit one or more messages to a given receiver, a sender determines whether it has enough available credits associated with the receiver to send the messages (i.e., whether the number of available credits meets or exceeds the number of messages to be sent). In one or more embodiments of the invention, determining whether the sender has a credit available includes determining whether the sender includes a non-zero credit balance associated with the receiver. For example, the sender may include a credit balance counter corresponding to each receiver with which the sender communicates. In such an example, determining if the sender has a credit available includes checking the counter associated with the receiver to determine whether the balance is non-zero. In one or more embodiments of the invention, if the sender determines that a credit is available for transmitting a message to the receiver, then the process proceeds to Step 412. However, if the sender determines that a credit is not available for transmitting a message to the receiver, then the process proceeds to Step 404.

In Step 404, the sender (i.e., a borrowing sender) sends a request for one or more credits to other senders (i.e., sharing senders). A borrowing sender is any sender that sends a request to borrow one or more credits. A sharing sender is any sender that receives a request to share credits with a borrowing sender. In one or more embodiments of the invention, the number of credits requested by the borrowing sender corresponds to the number of credits needed to transmit a given quantity of messages to the receiver. For example, if the borrowing sender has seven messages for a receiver but zero credits available for the receiver, the sender sends a request for seven credits to a sharing sender. The request may be in any form capable of conveying to the sharing sender a requested number of credits. For example, the request may be a packet and/or a message with a payload that includes a quantity of requested credits field. The request may also include information allowing the sender that receives the request to determine for which receiver the credits are requested.

In Step 406, after receiving the request, the sender to which the request was sent (i.e., the sharing sender) may perform a test to determine if the sharing sender has any and/or enough credits available to share with the borrowing sender. The test performed may vary depending on the situation of the sharing sender. In one or more embodiments of the invention, one test may be performed if the sharing sender is not communicating with the receiver, while a different test may be performed if the sharing sender is communicating with the receiver. In one or more embodiments of the invention, the test may also include determining whether the number of requested credits in the request has been satisfied. In such embodiments, the determination as to whether the request is yet satisfied may occur before the determination as to whether the sharing sender has credits available to share, and if the request has been fulfilled, the determination as to whether the sharing sender has credits available to share may not be performed. For example, if there are three senders in a ring, and the first sender (i.e., the borrowing sender) sends out a request to the second sender (i.e., a sharing sender), and the second sender completely fulfills the request, and then forwards the request along the ring to the third sender, the third sender may make a determination as to whether the request has already been fulfilled. If it has already been fulfilled, then the third sender may just pass the request along the ring back to the first sender without performing the determination as to whether the third sender has credits available to share.

As an example the test performed, if the sender that receives the request is not presently communicating with the receiver associated with the requested credits, the sender may determine if its credit balance for the receiver is greater than one. In such an example, if the credit balance is one or zero, then the sender does not have credits available to share, and if the credit balance is greater than one, then the sender is able to share all credits except one.

As another example of the test performed, if the sender that receives the request is in communication with the receiver for which credits are requested, the sender may determine if its credit balance for the receiver exceeds a pre-defined threshold quantity of credits (i.e., an active-communication threshold). For example, the threshold quantity of credits may be set at half of all credits associated with the receiver. Any credits beyond the threshold may be available to share with the borrowing sender. In one or more embodiments of the invention, if the sender has only the threshold quantity of credits or fewer, then the sender does not have any credits available to share with the borrowing sender.

In one or more embodiments of the invention, if the result of the test is that the sender that receives a request for credits (i.e., the sharing sender) has no credits available to share and/or the sharing sender has credits to share but the request remains unfulfilled (i.e., not enough credits to share to completely fulfill the request from the borrowing sender), the process returns to Step 404, and the request is sent to one or more other senders. The request may be sent by the sender that requires the credits (i.e., the borrowing sender). Additionally or alternatively, the request may be relayed by the sharing sender to another sender (e.g., the next sender in the ring network). In one or more embodiments of the invention, if the sharing sender had one or more credits available to share, the request may be updated to reflect the shared credits by indicating a remaining quantity of requested credits (i.e., the portion of the requested quantity of credits that is not yet fulfilled). In one or more embodiments of the invention, if a sharing sender shares one or more credits, then the credit balance of the sharing sender may be decremented by the number of credits shared. For example, a credit balance counter may be decremented. Once the request has been fully or partially fulfilled, and/or all senders have received the request and no credits are available to share, the process proceeds to Step 408.

In Step 408, the borrowing sender receives back the request that was sent in Step 404. In one or more embodiments of the invention, the request is returned to the borrowing sender from any sender (e.g., the last sender to receive the request). For example, in embodiments in which the senders are operatively connected by a ring network, and the request was transmitted by the borrowing sender in one direction on the ring, the request may be returned to the borrowing sender from a sharing sender operatively connected to the borrowing sender in the other direction on the ring. The returned request may be data in any form capable of conveying to the borrowing sender credits shared by one or more sharing senders and/or information related to the unfulfilled remaining quantity of credits requested. For example, the returned request may be in the form of a message that includes the credits shared by the sharing senders and a field indicating the unfulfilled quantity of requested credits. As another example, the returned request may include a message component that informs the borrowing sender what part of the request was unfulfilled, while credits are independently transferred to the borrowing sender via a different means (e.g., assertions on physical lines that increment the credit balance counter of the borrowing sender).

In Step 410, a determination is made as to whether the request for credits has only been partially fulfilled. In one or more embodiments of the invention, the determination is made by examining the response to determine what portion of the request remains unfulfilled. In one or more embodiments of the invention, if the request has not been fulfilled, the process returns to Step 404 after a predetermined or random delay (not shown), and the request is re-sent to sharing senders in order to obtain the remaining requested quantity of credits. In one or more embodiments of the invention, if the request has been at partially fulfilled or fully fulfilled, then the process proceeds to Step 412. In one or more embodiments of the invention, although not shown in FIG. 4A, if the request is only partially fulfilled, in addition to proceeding to Step 412, the borrowing sender may also generate a new request to send to other senders, the new request is effectively a request for the unfulfilled portion of the quantity of originally requested credits.

In Step 412, in order to transmit one or more messages to a given receiver, the borrowing sender determines whether it received any credits from the other senders in Step 410. In one or more embodiments of the invention, if the borrowing sender determines that a credit is available for transmitting a message to the receiver, then the process proceeds to Step 414. However, if the borrowing sender determines that a credit is not available for transmitting a message to the receiver, then the process proceeds to Step 404.

In Step 414, a message is sent to the receiver using a credit received in response to the request. For example, the sender may be operatively connected to the receiver via a network on a chip. In such an example, the message sent to the receiver may be a packet (e.g., including various headers and a payload). The receipt of the message by the receiver is discussed further in the description of FIG. 4B.

In Step 416, a determination is made by the borrowing sender as to whether the sender has any additional messages to send to the receiver. For example, if the sender had three messages to transmit to the receiver, and one is sent in Step 414, then the sender has two messages left to send. If the sender has no messages left to send to the receiver, then the process may end. If the sender has additional messages to transmit to the receiver, then the process may return to Step 402 and determine if the sender has any credits available for the receiver. This may occur, for example, if the receiver has returned any credits while the sender awaited a response to the request.

FIG. 4B shows a flowchart describing a method for processing messages received at a receiver. In Step 452, at least one message is received by the receiver from a sender. Data may be received by the receiver in any form capable of conveying to the receiver the intended payload, and possibly additional information, such as the sender from which the data is received. In one or more embodiments of the invention, a buffer of the receiver includes one buffer slot for each credit available to senders operatively connected to the receiver. Accordingly, in one or more embodiments of the invention, only messages transmitted using a credit associated with the receiver may be received by the receiver.

In Step 452, each received message is placed into a buffer slot within a buffer of the receiver. In one or more embodiments of the invention, placing a received message into a buffer slot includes modifying a storage medium (i.e., the buffer) to reflect at least a portion of the information included in the message. In one or more embodiments of the invention, messages are placed in buffer slots (i.e., enqueued) in order to await processing. In one or more embodiments of the invention, some portion of the message may be stored outside the buffer with the portion of the message stored in the buffer including a reference to the remaining portion(s) of the message.

In Step 454, a message received in Step 450 is selected by the receiver for processing. In one or more embodiments of the invention, the message is selected using any available selection method. For example, the buffer may be implemented as a first-in, first-out buffer from which messages are processed in the order that they are received. As another example, the receiver may be include functionality to implement a system for selecting messages to process in which messages from certain senders, or groups of senders, are processed before other messages according to a pre-defined priority ranking system.

In Step 456, the message is processed by the receiver. In one or more embodiments of the invention, processing the message means examining the message to determine the contents of the message and, if necessary, performing any actions required to process the message (e.g., transmit a write instruction, evict a cache line, etc.).

In Step 458, a credit is returned to the sender that sent the now-processed message. In one or more embodiments of the invention, once the message is processed, the receiver returns the credit by any method capable of conveying a credit back to the sender. In one or more embodiments of the invention, a sender that receives a credit from a receiver increments a credit balance associated with the receiver. Examples of methods for returning credits include, but are not limited to: (i) asserting high (or low) on a physical line from receiver to the sender (e.g., to a credit balance counter of the sender), causing the sender to increment the credit balance corresponding to the receiver; (ii) returning a message (e.g., packet) to the sender that includes the credit; (iii) sending to the sender a response to the processed message that implies that the message has been processed, causing the sender to increment a credit balance; and/or (iv) using a sideband signal/packet.

In Step 460, a determination is made as to whether any unprocessed messages remain in the buffer of the receiver. In one or more embodiments of the invention, the determination is made by examining the buffer to determine if any buffer slots remain occupied by a message received from a sender. In one or more embodiments of the invention, if any unprocessed messages remain in the buffer, the process returns to Step 454, and one of the unprocessed messages is selected for processing. In one or more embodiments of the invention, if no unprocessed messages remain, then the process might end.

FIGS. 5A, 5B, 5C, 5D, 5E, 5F, 5G, 5H, 6A, 6B, 6C, 6D, and 6E show an example in accordance with one or more embodiments of the invention. The following example is for explanatory purposes only and not intended to limit the scope of the invention.

Figure 5A:
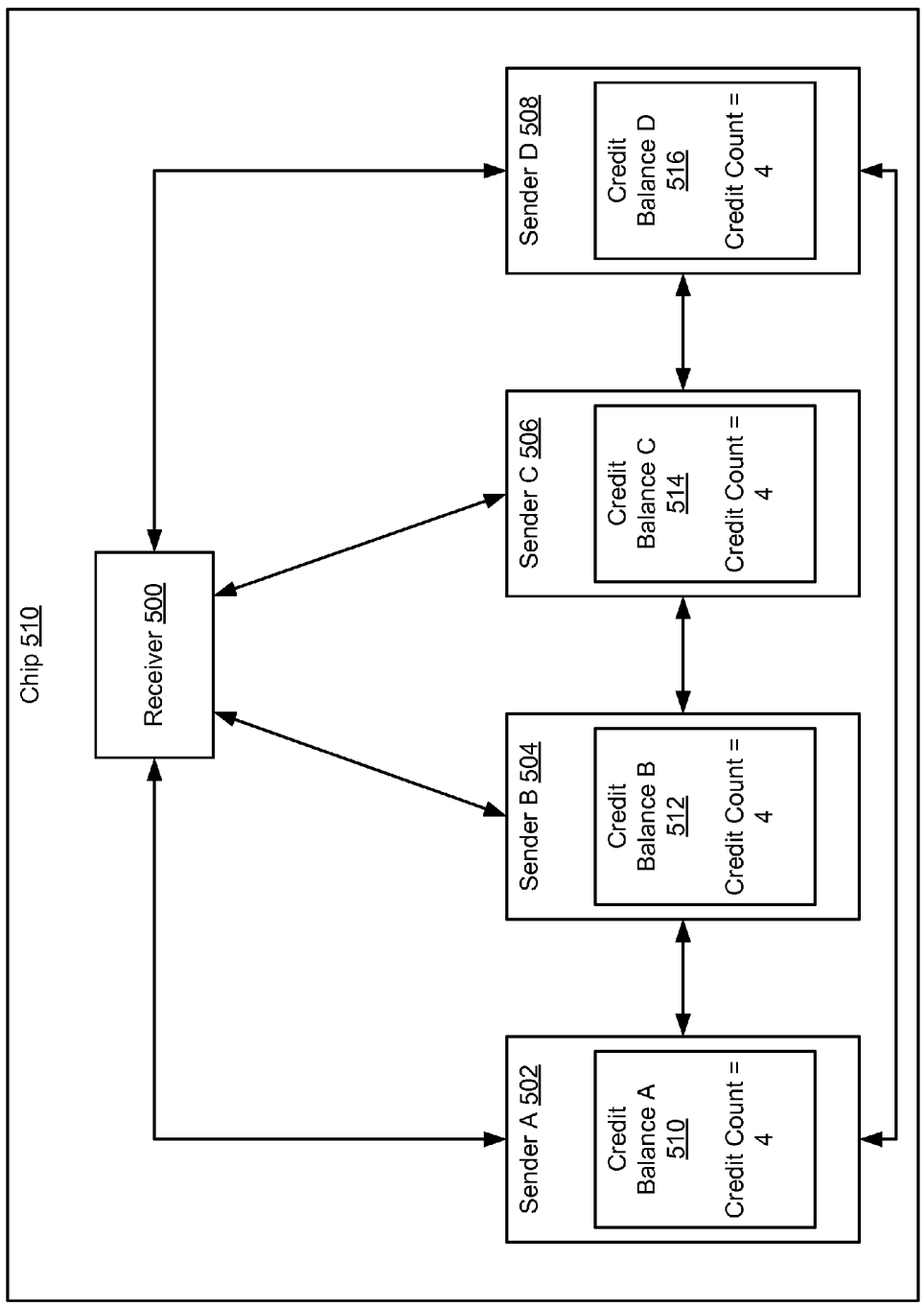
FIGS. 5A, 5B, 5C, 5D, 5E, 5F, 5G, 5H, 6A, 6B, 6C, 6D, and 6E show an example in accordance with one or more embodiments of the invention.

Referring to FIG. 5A, consider a scenario in which a receiver (500) is a last level cache operatively connected via a NOC to four senders (sender A (502), sender B (504), sender C (506), sender D (508)). Messages communicated between the sender (sender A (502), sender B (504), sender C (506), sender D (508)) and the receiver (500) are packets. The senders are each an accelerator for data analytics and, as shown, are operatively connected to one another via a unidirectional ring network. The receiver (500) includes a buffer (not shown) with sixteen buffer slots (not shown). Each sender (sender A (502), sender B (504), sender C (506), sender D (508)) includes a credit balance counter (credit balance A (510), credit balance B (512), sender C (514), sender D (516)) for keeping count of a quantity of credits available to the sender. The total quantity of credits corresponding to the receiver, that are available to all of the senders, is equivalent to the number of buffer slots in the buffer of the receiver (i.e., there are sixteen total credits). In such a scenario, the receiver, the senders, the NOC, and the sender ring interconnect are all part of a single chip (510) that includes many additional components (not shown).

FIG. 5A shows an initial state of the system in which each sender (sender A (502), sender A (504), sender A (506), sender A (508)) is allocated an equal number of credits (i.e., four credits). Sometime later, sender A (502) begins communicating with the receiver (500), seeking to transmit eleven messages to the receiver. To that end, sender A (502) checks to determine if any credits corresponding to the receiver (500) are available to sender A via checking the credit balance counter of sender A. Sender A (502) determines that a credit is available, because four credits were initially allocated to sender A. Therefore, sender A (502) uses one credit and transmits the first of the eleven messages to the receiver (500). Once the message is sent, sender A (502) again checks the credit balance counter, finds that a credit is available, and sends a message to the receiver (500) using the credit. The first four messages are transmitted to the receiver (500) using this process.

Figure 5B:
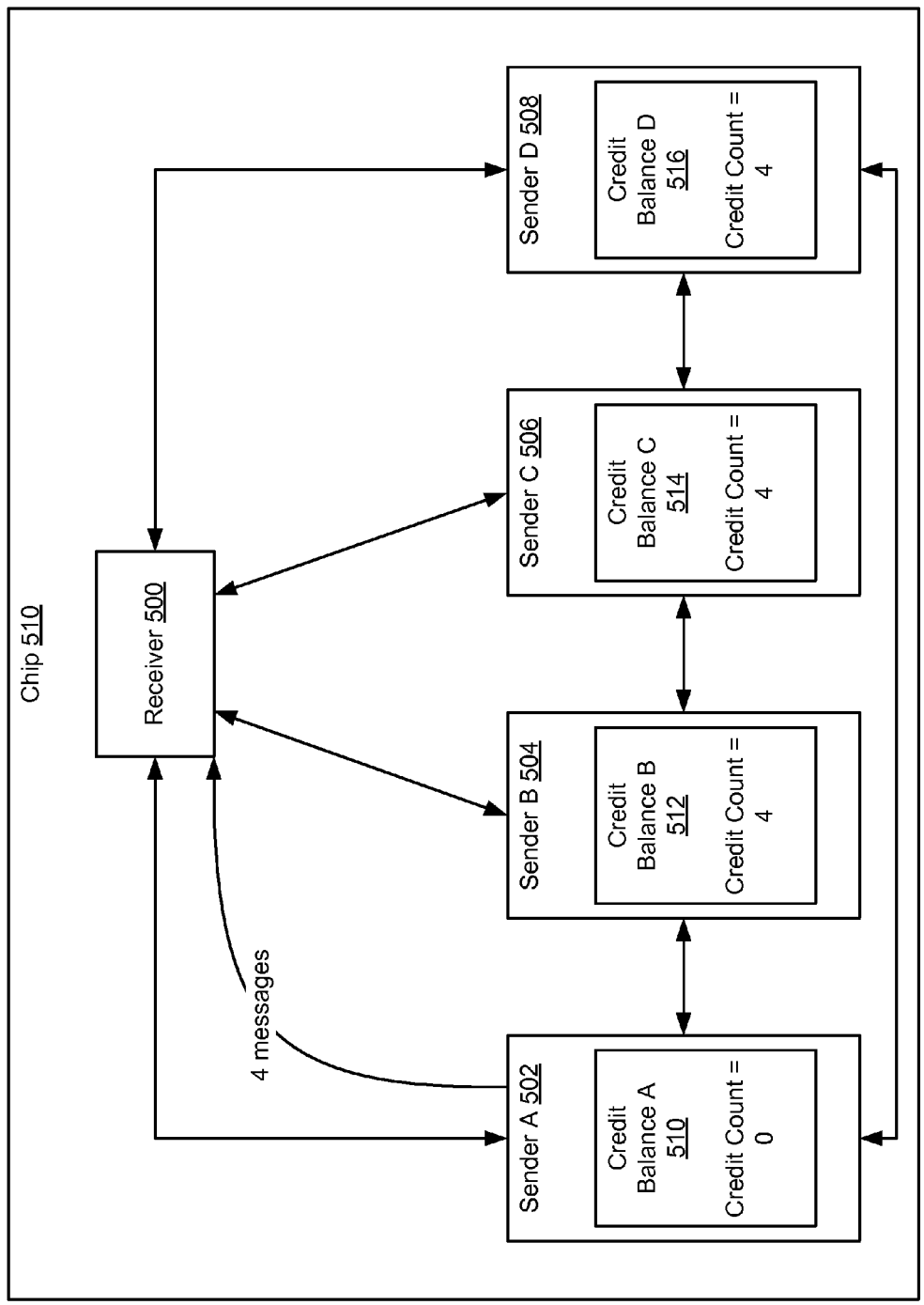

FIG. 5B shows the credit sharing system after sender A (502) has sent the first four messages. In FIG. 5B, sender A (i.e., the borrowing sender) has zero credits, as they have all been used to send messages to the receiver, which will return the credits to sender A once the messages are processed. Sender B, sender C, and sender D still have the four credits that they were initially allocated.

When sender A (502) seeks to send the fifth message to the receiver (500), sender A determines that credit balance counter A (510) shows no more credits available for sending messages to the receiver. Therefore, sender A (500) performs a calculation to determine that seven credits are needed to send the remainder of the messages to the receiver (500). Sender A (502) then generates a request (request A (518)) for seven credits and sends the request via the ring network to sender B (504). This makes sender A (510) a borrowing sender.

Figure 5C:
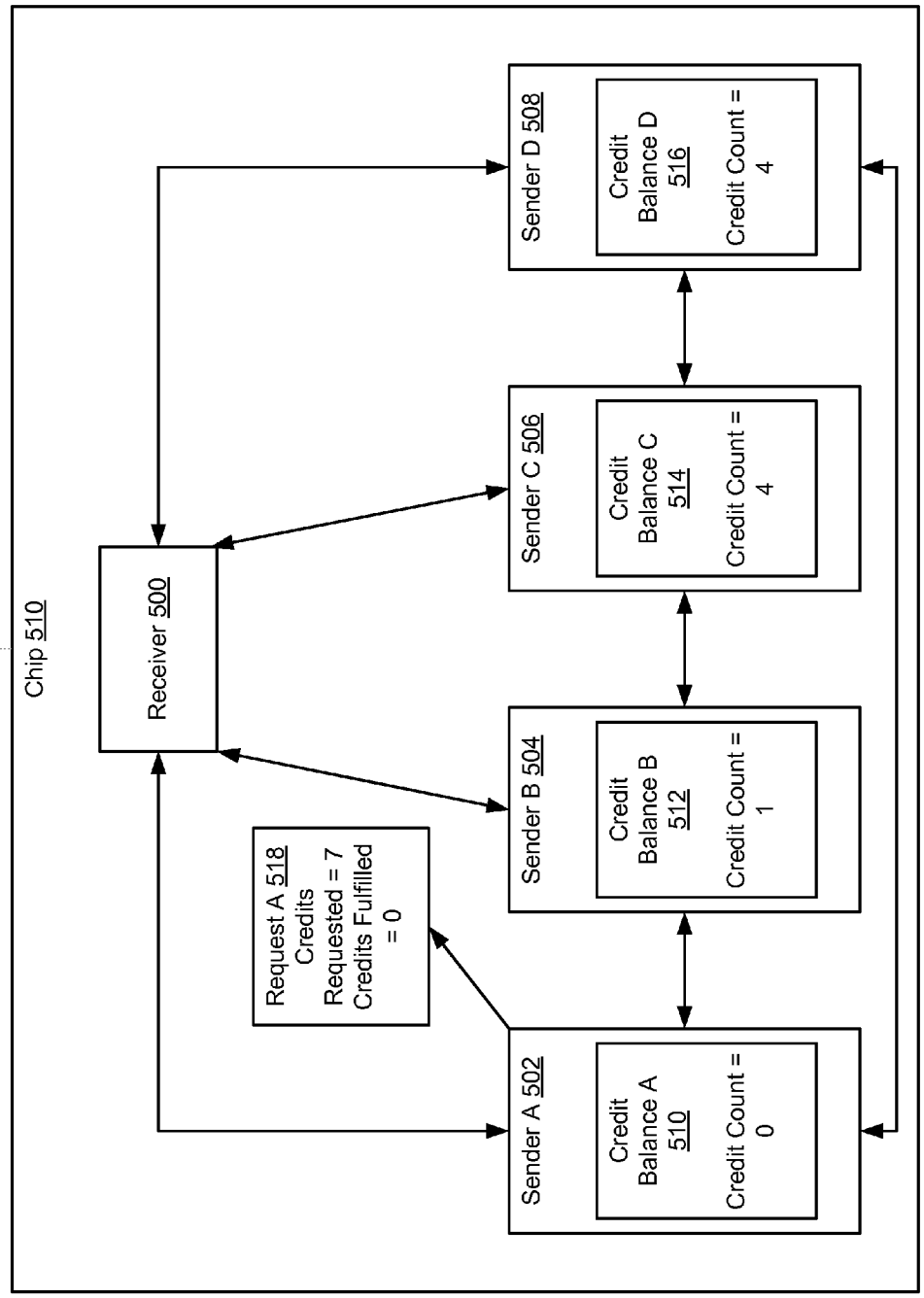

FIG. 5C shows the credit sharing system after sender A (502) has sent request A via the sender ring network. In FIG. 5C, sender A (i.e., the borrowing sender) has zero credits, as they have all been used to send messages to the receiver, which will return the credits to sender A once the messages are processed. Sender B, sender C, and sender D still have the four credits that they were initially allocated. Request A (518) includes a request for seven credits, none of which have yet been fulfilled. One of ordinary skill in the art and having the benefit of this disclosure will recognize that, although FIG. 5C and several subsequent figures show a request (e.g., request A (518)) being pointed to by an arrow coming from a sender that either created the request or is adding credits to the request (i.e., sharing credits), the request itself is transmitted between the senders via the ring network by which the senders are operatively connected.

After receiving the request from sender A (502), sender B (504), which, having received a request to share credits is now a sharing sender, performs a test to determine if it (i.e., sender B) has credits available to share with borrowing sender A. In the present example, sharing sender B (504) is not actively communicating with the receiver (500). Accordingly, the test used by sharing sender B (504) is to check credit balance counter B (512) of sender B to determine if more than one credit is available to sender B for sending messages to the receiver. As mentioned above, sender B was initially allocated four credits, and has yet to use one of the credits. Therefore, sharing sender B, with four credits available, has three credits available to share with borrowing sender A, keeping one. Sharing sender B thus modifies request A (518) to include three credits, and to indicate that borrowing sender A still needs four additional credits to satisfy the request (e.g., via the difference between the credits requested and the credits fulfilled). Sender B (504) then sends the modified request A (518) to sender C (506) via the ring network.

One skilled in the art and having the benefit of this disclosure will appreciate that although specific numbers of credits are used in the present example, the credit sharing system may be designed such that any number of credits are shared (e.g., all credits, only one credit, etc.) by a given sender.

Figure 5D:
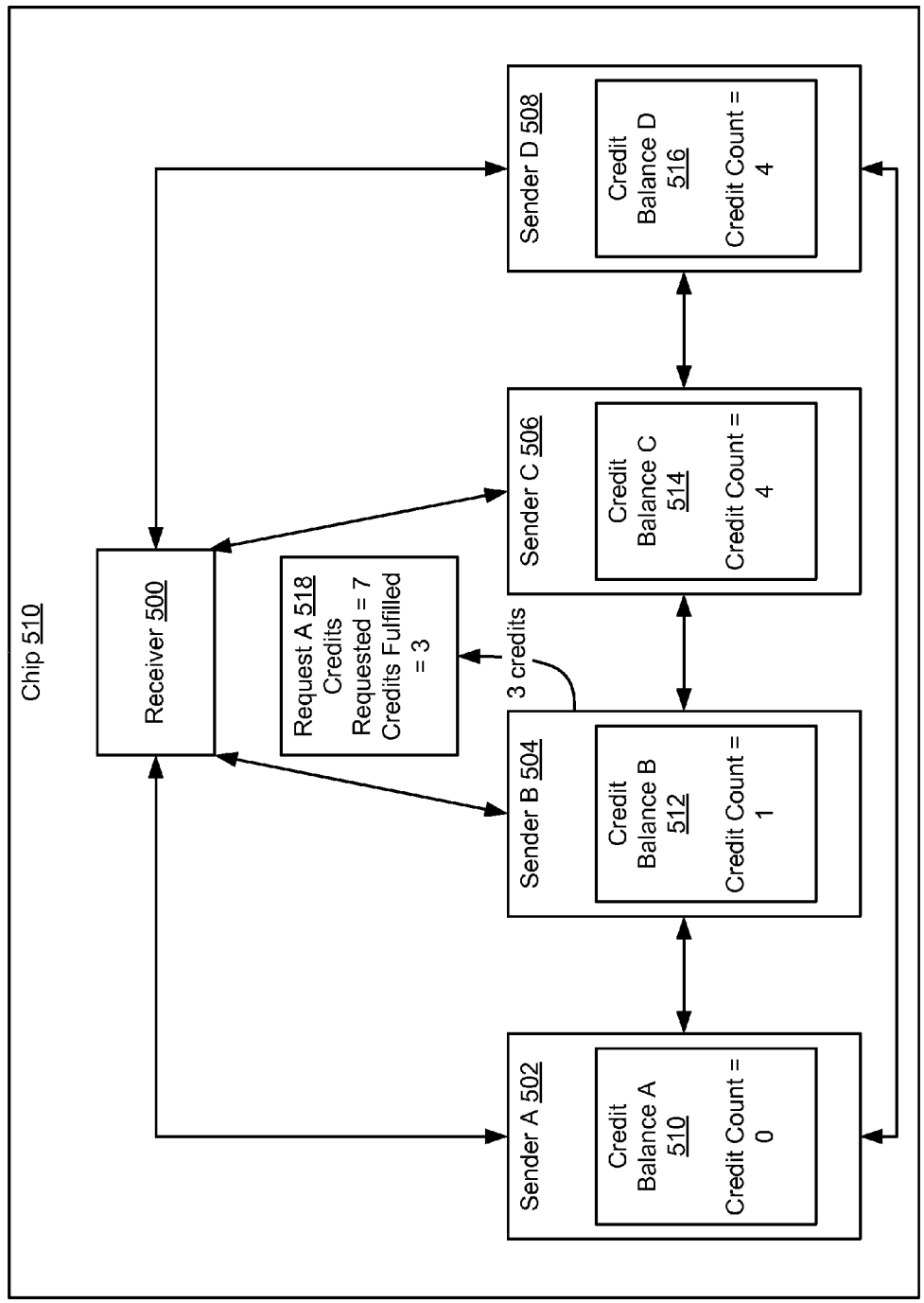

FIG. 5D shows the credit sharing system after request A (518) has been modified to include the three credits. In FIG. 5D, sender A (i.e., the borrowing sender) still has zero credits, as they have all been used to send messages to the receiver. Sender B (504) has one credit, as three of the credits that sender B was initially allocated have been added to request A (518). Sender C (514) and sender D (516) still have the four credits that they were initially allocated. Request A (518) includes a request for seven credits, three of which have been fulfilled.

After receiving the request from sharing sender B (504), sender C (506), also now a sharing sender, performs the same test as was performed by sender B to determine if sender C has credits available to share with borrowing sender A. Accordingly, the test used by sharing sender C checks credit balance counter C (506) of sender C to determine if more than one credit is available to sender C for sending messages to the receiver. As mentioned above, sender C was also initially allocated four credits, and has yet to use one of the credits. Therefore, sharing sender C, with four credits available, has three credits available to share with sender A, keeping one. Sender C thus modifies request A (518) to include three more credits (bringing the total to six credits), and to indicate that borrowing sender A still needs one additional credit to satisfy the request. Sender C (506) then sends the modified request A (518) to sender D (508) via the ring interconnect.

Figure 5E:
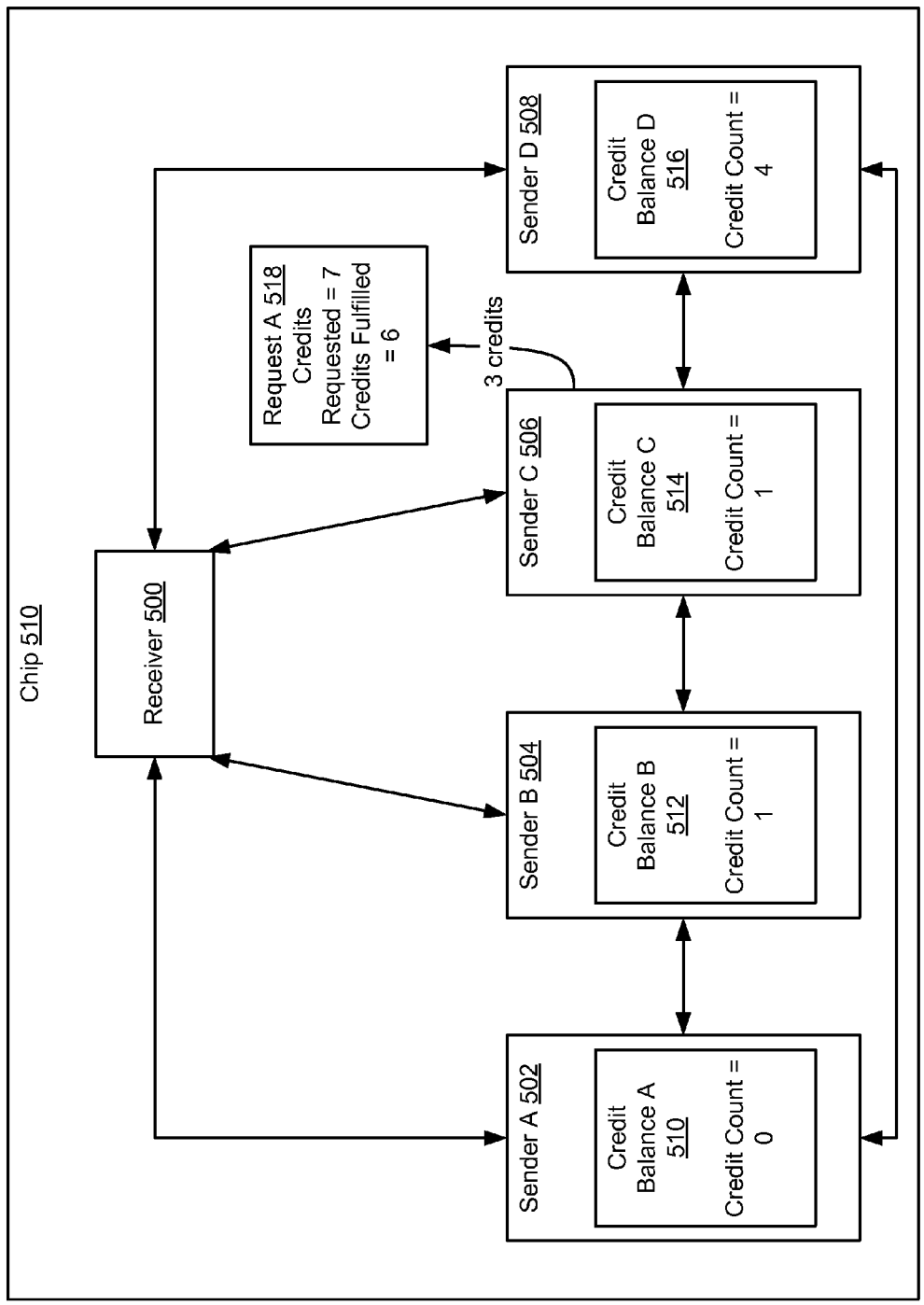

FIG. 5E shows the credit sharing system at this point. In FIG. 5E, sender A (i.e., the borrowing sender) still has zero credits, as they have all been used to send messages to the receiver. Sharing sender B has one credit, as three of the credits that sender B was initially allocated have been added to request A (518), which now includes six credits. Sharing sender C also has one credit, as three of the credits that sender C was initially allocated have also been added to request A (518). Sender D still has the four credits that it was initially allocated.

After receiving the request from sender C (506), sender D (508), now a sharing sender, performs the same test as was performed by sharing sender B (504) and sharing sender C (506) to determine if sharing sender D has credits available to share with borrowing sender A (502). Accordingly, the test used by sender D is to check credit balance counter D (508) of sender D to determine if it indicates that more than one credit is available to sender D for sending messages to the receiver. As mentioned above, sharing sender D was also initially allocated four credits, and has yet to use one of the credits. Therefore, sharing sender D, with four credits available, has three credits available to share with sender A. However, the request, as modified by sharing sender C, indicates that borrowing sender A only needs one more credit. Sharing sender D thus modifies request A (518) to include one more credit, bringing the total to seven credits, which is the quantity of credits originally requested by borrowing sender A. Sharing sender D also modifies request A (518) to indicate that borrowing sender A needs no additional credits to satisfy the request. Sharing sender D (508) then sends the modified request A (518) to the next sender in the ring interconnect, which is borrowing sender A (502).

Figure 5F:
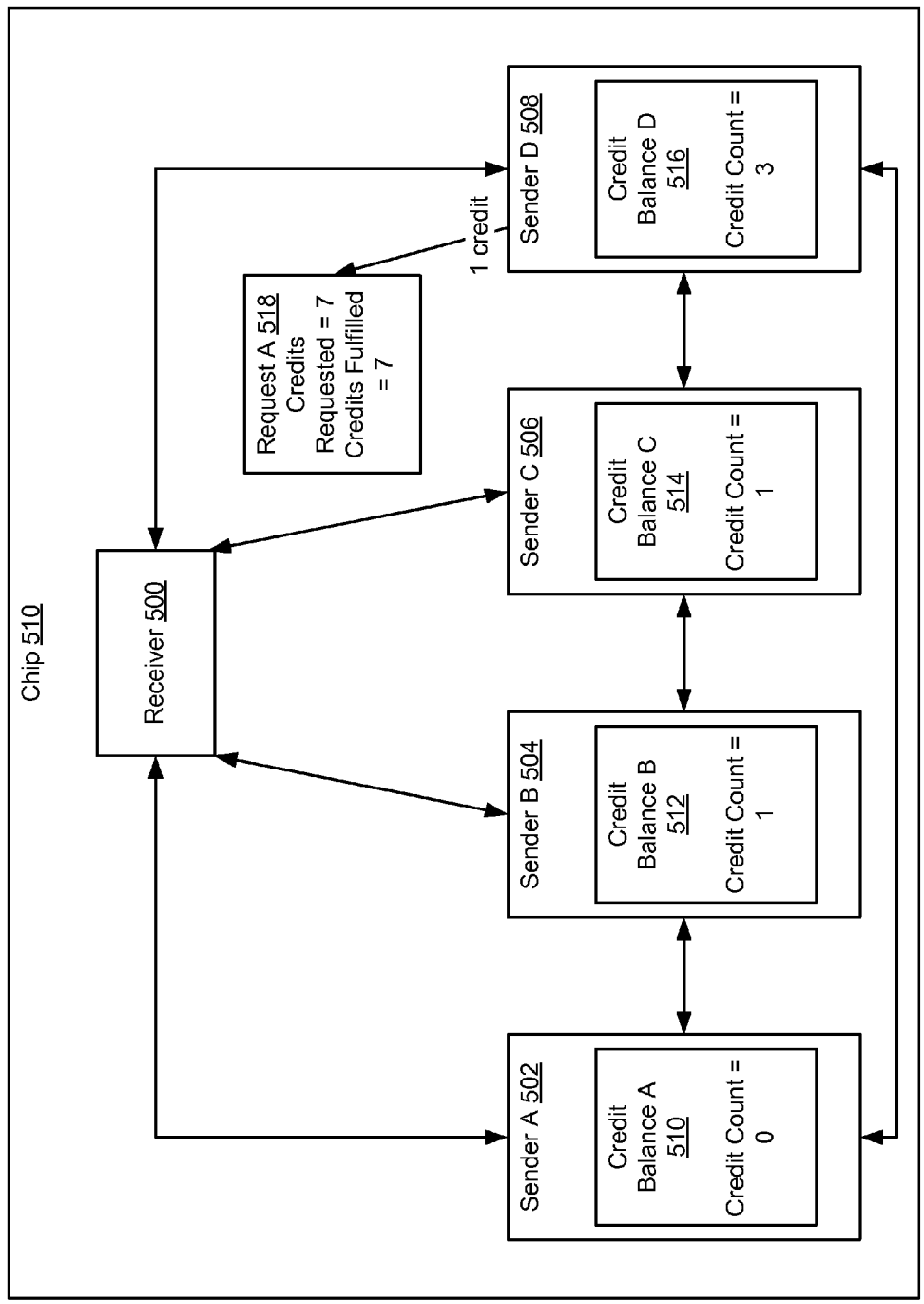

FIG. 5F shows the credit sharing system after sharing sender D (516) has added one credit to request A (518), but before the request is sent to borrowing sender A (502). In FIG. 5F, sender A (i.e., the borrowing sender) still has zero credits. Sender B still has one credit, as three of the credits that sender B was initially allocated were shared via adding the credits to the request (518). Sender C also has one credit, as three of the credits that sender C was initially allocated were shared via adding the credits to the request (518). Sender D has three credits, as one of the credits that sender D was initially allocated was also shared. Request A (518) includes a request for seven credits, all of which have now been fulfilled.

After receiving the response to the request from sender D (508), sender A (502) finds that the response includes the requested seven credits. Therefore, the credit balance counter of sender A is incremented seven times to reflect the receipt of the credits shared with sender A by the other senders.

Figure 5G:
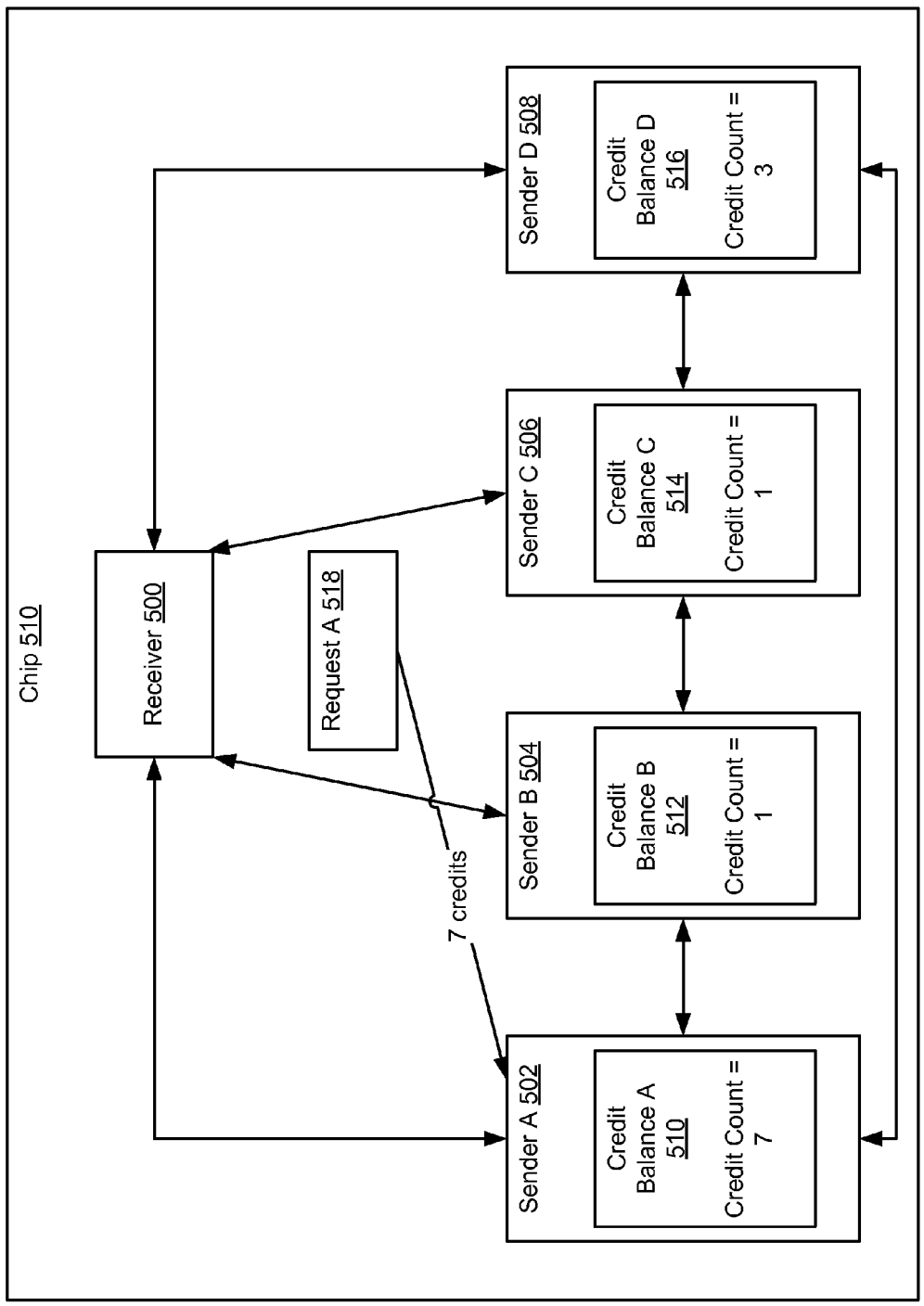

FIG. 5G shows the credit sharing system after request A (518) is sent to borrowing sender A (502). In FIG. 5G, sender A (i.e., the borrowing sender) includes the seven credits received as a part of request A. Sender B still has one credit, as three of the credits that sender B was initially allocated were shared via adding the credits to the request. Sender C also has one credit, as three of the credits that sender C was initially allocated were shared via adding the credits to the request. Sender D has three credits, as one of the credits that sender D was initially allocated was also shared.

Figure 5H:
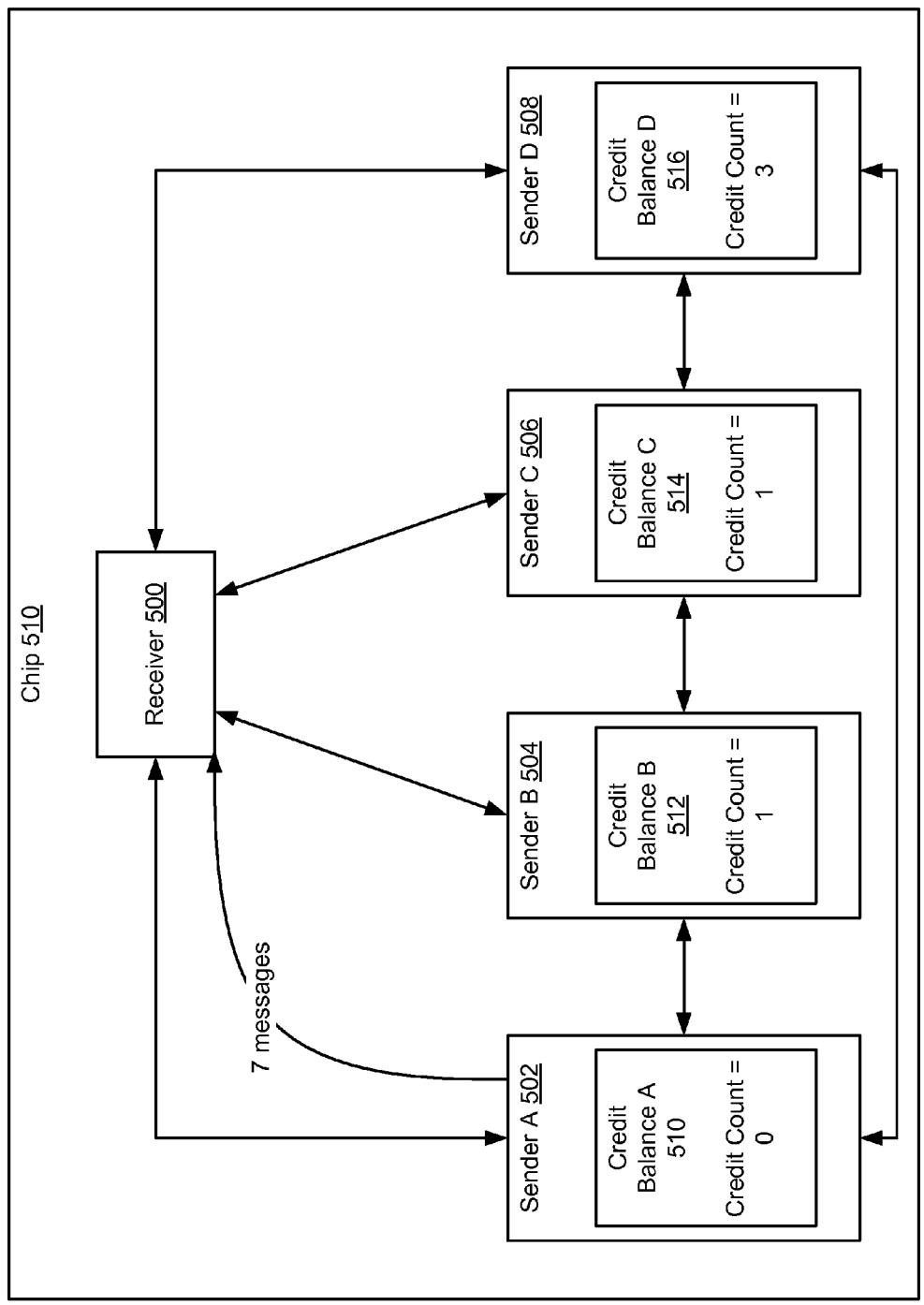

Sender A (502) then uses one of the credits to transmit each of the remaining seven of the eleven messages to the receiver (500). FIG. 5H shows the credit sharing system at this point. In FIG. 5H, sender A (i.e., the borrowing sender) again has zero credits, as they have all been used to send seven messages to the receiver. Sender B still has one credit, as three of the credits that sender B was initially allocated were shared via adding the credits to the request. Sender C also has one credit, as three of the credits that sender C was initially allocated were shared via adding the credits to the request. Sender D has three credits, as one of the credits that sender D was initially allocated was also shared. Eleven credits are with the receiver, having been used by sender A to transmit eleven messages to the sender.

Continuing the example from the perspective of the receiver (500), each of the first seven messages received from sender A (502) are placed by the receiver into a buffer slot. The receiver is configured to process messages in the order in which the messages are received. After a message from sender A (502) is processed, the receiver sends a message back to sender A (502) that includes a credit, thereby returning a credit to sender A (502). In response to receiving the returned credit, sender A increments the credit balance counter of sender A.

During the time that sender A (502) is communicating with the receiver (500) (e.g., any time sender A has unsent messages for the receiver and or is awaiting a response from the receiver), but before any credits are returned to sender A by the receiver, sender D (508) seeks to transmit five messages to the receiver. However, as shown in FIG. 5G, sender D (508) only has three credits. These three credits are used to transmit three of the five messages to the receiver (500).

Figure 6A:
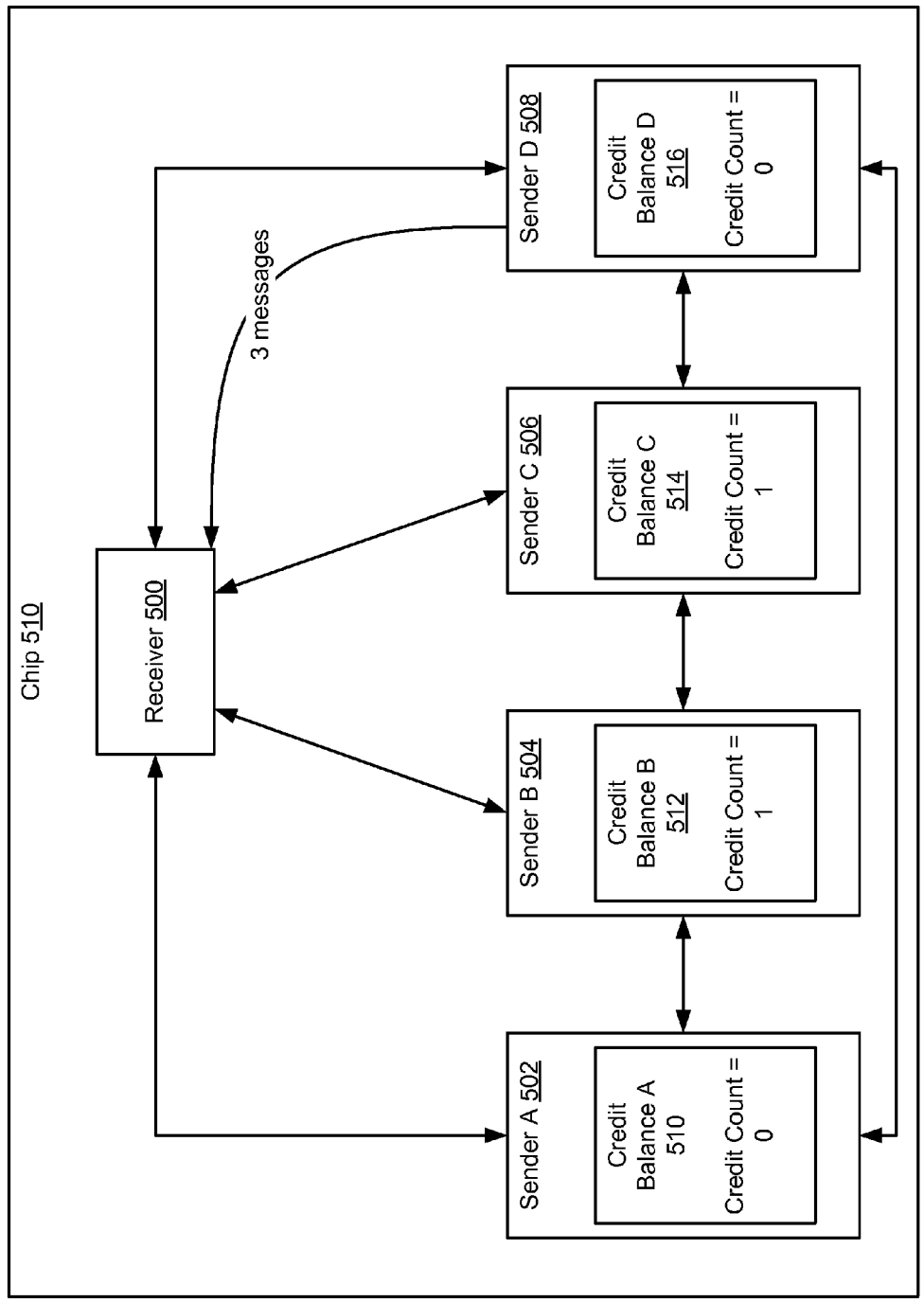

FIG. 6A shows the credit sharing system after sender D (508) has sent the first three messages to the receiver (500). In FIG. 6A, sender A still has zero credits, as they have all been used to send messages to the receiver. Sender B still has one credit, as three of the four credits that sender B was initially allocated were shared via the previous request (i.e., the request sent by sender A). Sender C still has one credit, as three of the four credits that sender C was initially allocated were also shared via the previous request. Sender D has zero credits, as sender D has used all three remaining credits to transmit three messages to the receiver. Fourteen credits remain with the receiver, including eleven received by the receiver from sender A during the transmission of messages to the receiver, and three received from sender D during the transmission of messages to the receiver. After running out of credits, sender D generates request B (520) in an attempt to borrow an additional two credits. Accordingly, sender D (516) is now a borrowing sender.

Sender D (516) transmits request B (520) to sender A via the ring interconnect. After receiving the request from borrowing sender D (508), sender A (502), now a sharing sender, performs a test to determine if it (i.e., sender A) has credits available to share with borrowing sender D. In the present example, sharing sender A (502) is actively communicating with the receiver (508). Accordingly, the test used by sharing sender A checks the credit balance counter of sharing sender A to determine if sender A has more than half of the total quantity of credits corresponding to the receiver that were initially allocated to the senders (e.g., more than eight, which is half of the 16 credits initially allocated). As mentioned above, sharing sender A has used all credits available to sender A and is still in communication with the receiver. Therefore, sharing sender A, with no credits available, has no credits available to share with borrowing sender D. Sharing sender A thus sends the request to sender B (504) via the ring interconnect.

After receiving the request from borrowing sender D (508), sender B (504), once again a sharing sender, performs a test to determine if it (i.e., sender B) has credits available to share with borrowing sender D. In the present example, sharing sender B (504) is not actively communicating with the receiver (500). Accordingly, the test used by sharing sender B (504) checks credit balance counter B (512) to determine if more than one credit is available to sender B for sending messages to the receiver. As mentioned above, sender B previously shared three of the initial four credits allocated to sender B. Therefore, sharing sender B, with only one credit available does not have any credits available to share with borrowing sender D. Sender B thus sends the request to sender C (506) via the ring interconnect. While sender B is performing the aforementioned test and sending the request to sender C, the eleven credits previously used by sender A are returned to sender A by the receiver (500), which has processed the eleven messages previously received from sender A.

Figure 6B:
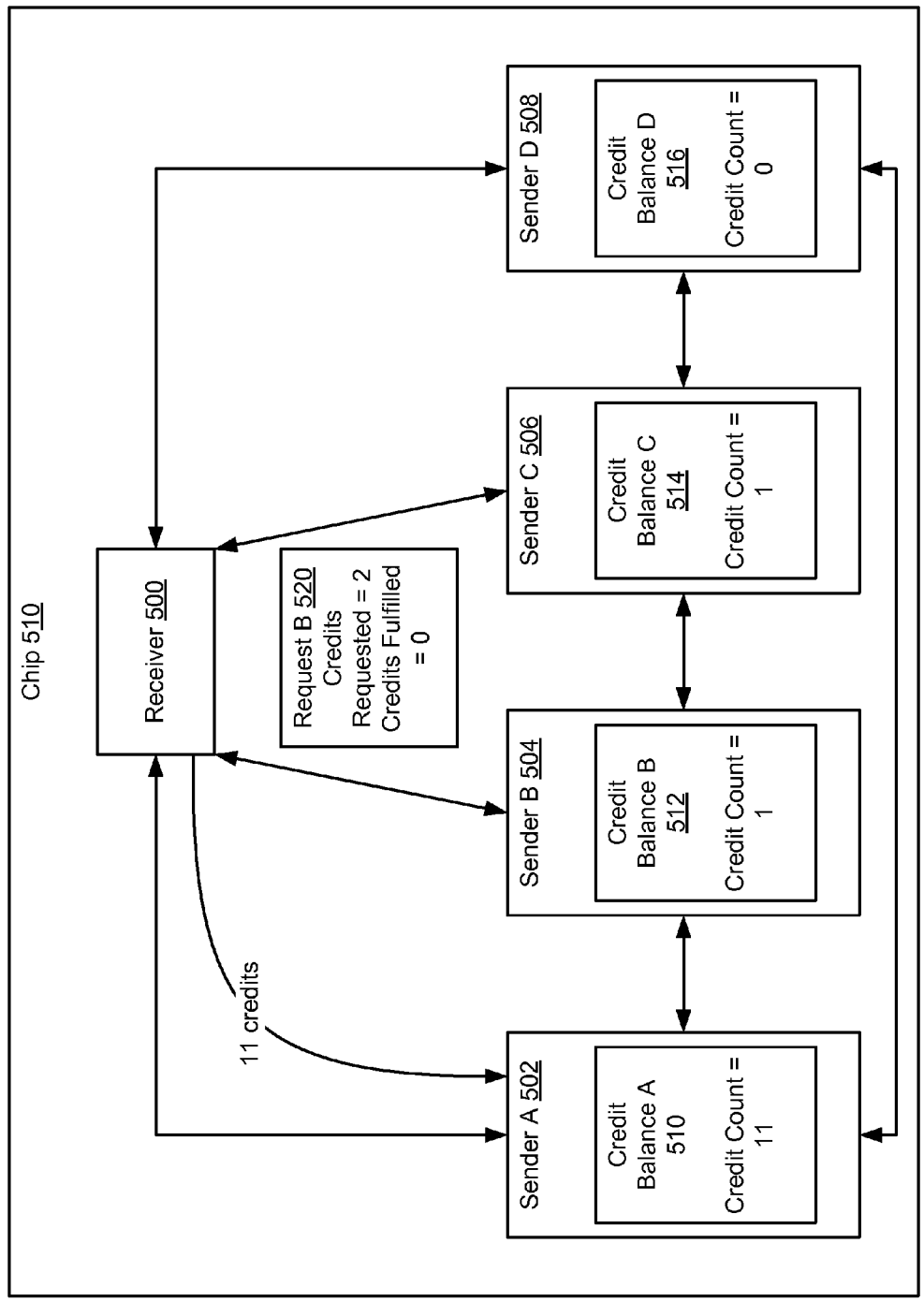

FIG. 6B shows the credit sharing system after the request B (520) has been generated and been sent to sender A and sender B, but before request B is received by sender C (506).

In FIG. 6B, sender A has 11 credits, which have been returned to sender A by the receiver. Sender B still has one credit. Sender C still has one credit. Sender D has zero credits, as sender D has used three credits to transmit three messages to the receiver.

After receiving the request from sender B, sender C, once again a sharing sender, performs a test and determines it (i.e., sender C) has no credits to share with borrowing sender D. Therefore sharing sender C returns the request to borrowing sender D unfulfilled, as no credits were added to the request. After a delay, borrowing sender D re-sends the request to sharing sender A (502) via the ring interconnect. After receiving the request from borrowing sender D (508), sharing sender A (502) again performs a test to determine if sharing sender A has credits available to share with borrowing sender D. In the present example, sharing sender A (502) is actively communicating with the receiver (508). Accordingly, the test used by sharing sender A is to check the credit balance counter of sender A to determine if sender A (502) has more than half (e.g., more than eight) of the total quantity of credits (i.e., 16) corresponding to the receiver and allocated to the senders. As mentioned above, sender A has eleven credits that were returned by the receiver. Therefore, sender A has three credits (i.e., the difference between eight and eleven) available to share with borrowing sender D. However, the request indicates that borrowing sender D only needs to borrow two credits. Sender A thus modifies request B (520) to include two credits. Sender A also modifies the request to indicate that sender D needs no additional credits to satisfy the request. Sender A (502) then sends the modified request to the next sender in the ring interconnect, which is sender B (504). Sender B determines that the request is marked as fulfilled, and sends the request to sender C via the ring interconnect. Sender C determines that the request is marked as fulfilled, and sends the request to sender D via the ring interconnect.

Figure 6C:
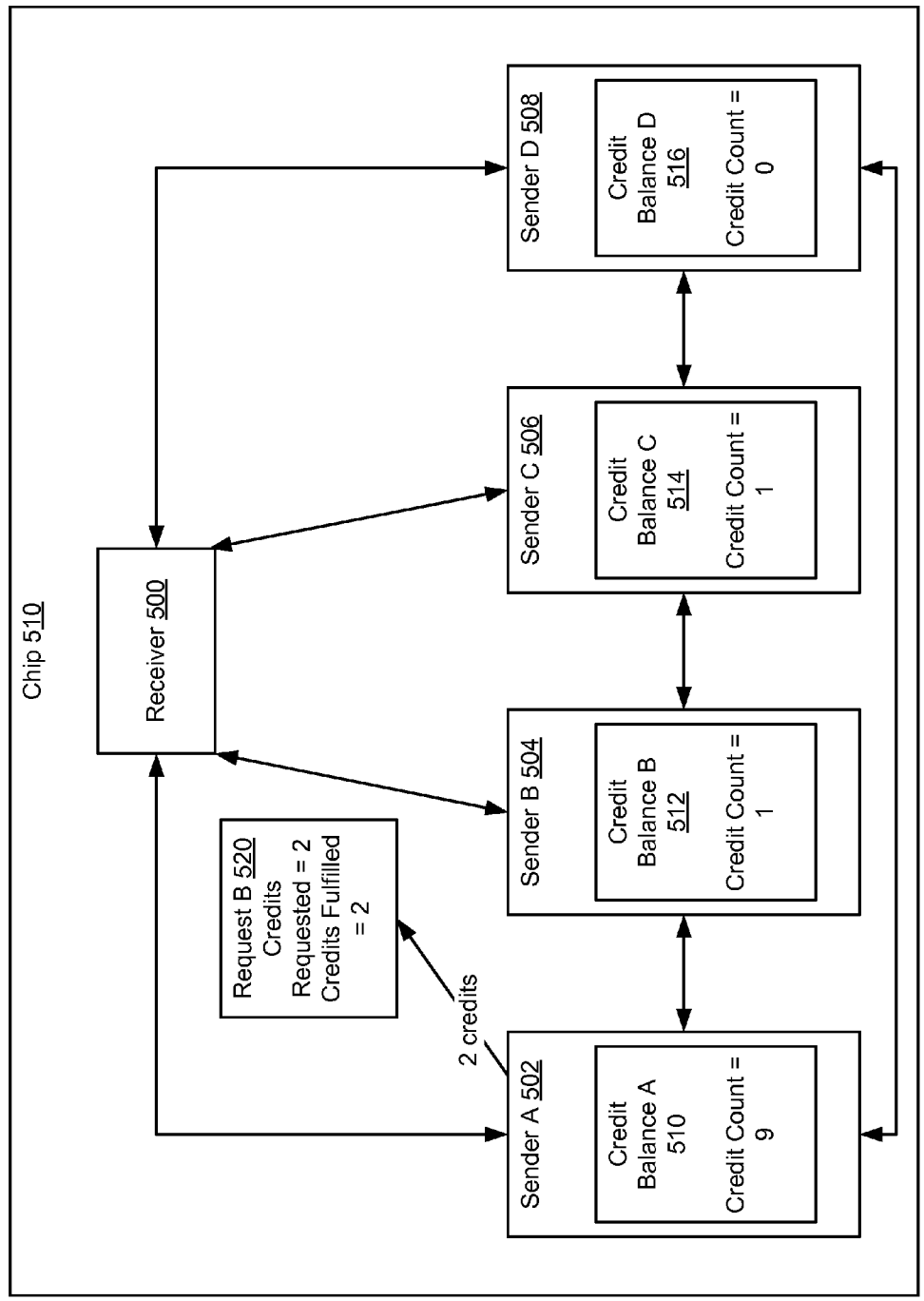

FIG. 6C shows the credit sharing system after sharing sender A adds two credits to request B (520), but before request B (520) is received by borrowing sender D (e.g., after being sent to sender B and sender C). In FIG. 6C, sender A has nine credits, having been returned eleven by the receiver and then adding two credits to request B (520). Sender B still has one credit, as three of the credits that sender B was initially allocated were shared via adding the credits to the request. Sender C also has one credit, as three of the credits that sender C was initially allocated were shared via adding the credits to the request. Request B (520) includes two credits, which were shared by sharing sender A. Three credits remain with the receiver, having been used by sender D to transmit three messages to the receiver.

After receiving the response to the request from sender C (506), sender D (508) finds that the response includes the requested two credits, which were added to the request by sharing sender A. Therefore, credit balance counter D (516) is incremented twice to reflect the receipt of the credits shared with borrowing sender D by the other senders.

Figure 6D:
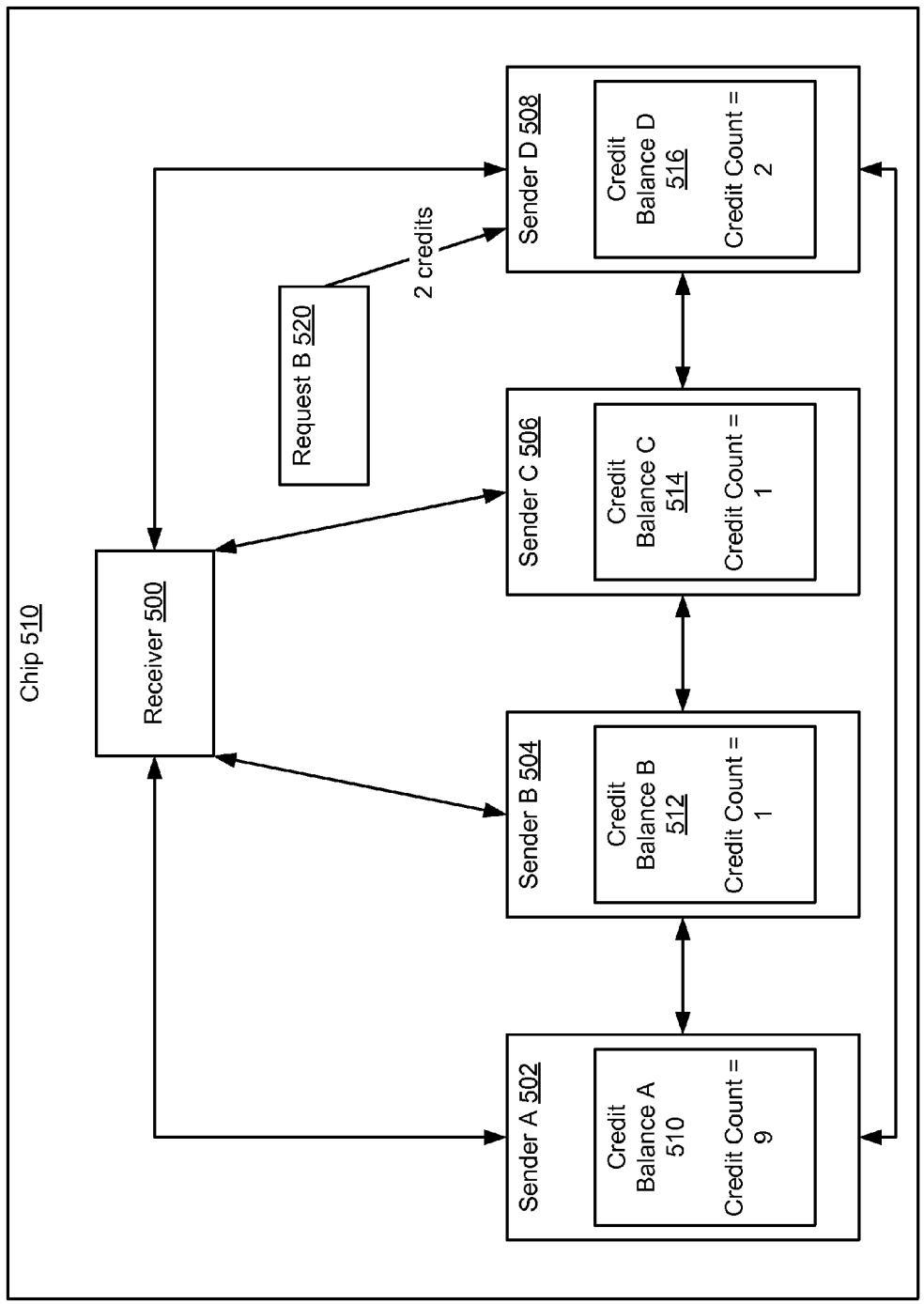

FIG. 6D shows the credit sharing system after request B (520) is returned to borrowing sender D (508). In FIG. 6D, sender A (i.e., the sharing sender) includes the nine credits after sharing two with sender D. Sender B still has one credit, as three of the credits that sender B was initially allocated were shared via adding the credits to the request. Sender C also has one credit. Sender D has two credits, which were received from sender A.

Figure 6E:
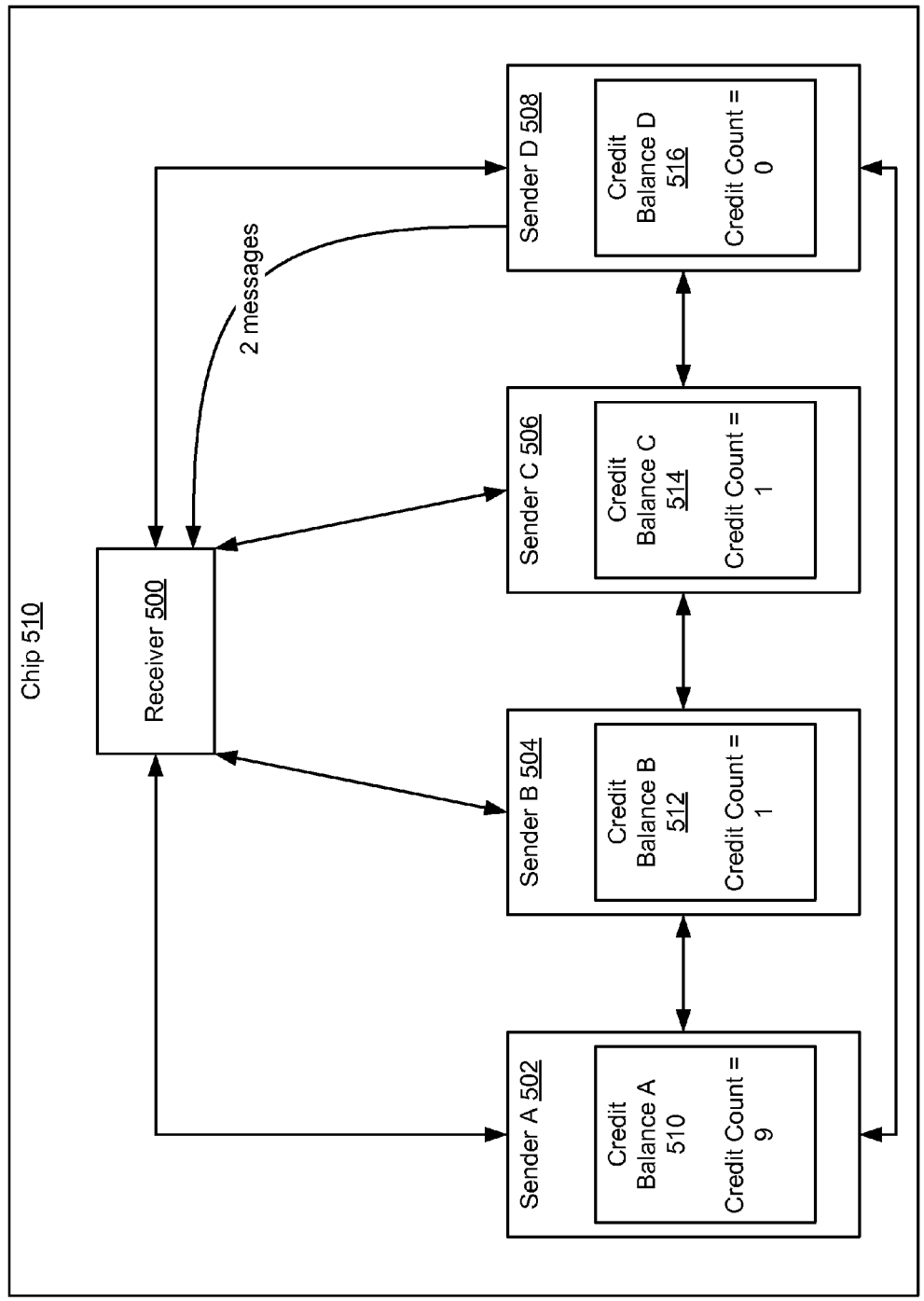

Borrowing sender D (508) then uses the two credits added to the request by sender A (502) to send the remaining two messages to the receiver. FIG. 6E shows the credit sharing system at this point. In FIG. 6E, sender A has nine credits, having been returned eleven by the receiver and then sharing two of the eleven with sender D. Sender B still has one credit, as three of the credits that sender B was initially allocated were shared via adding the credits to the request. Sender C also still has one credit. Borrowing sender D again has zero credits, having used the two credits shared by sender A to transmit the final two of its five messages to the receiver. Five credits are with the receiver, having been used by sender D to transmit five messages to the receiver.

In one or more embodiments of the invention, the sharing of credits by the senders results in reducing the total number of credits needed by any one sender. In one or more embodiments of the invention, because each credit requires a corresponding buffer slot in a buffer of a receiver, any reduction in the quantity of credits results in a reduction in required buffer slots, which reduces the buffer size requirements. In one or more embodiments of the invention, because not all senders communicate with the receiver at the same time, the use of a credit sharing scheme may have little or no impact on performance of the system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of dynamic flow control using credit sharing comprising:
    allocating portions of a plurality of credits to each of a plurality of senders, wherein each of the plurality of credits is for communicating with a receiver;
    transmitting, by a first sender of the plurality of senders, a first message to the receiver using a first credit of a first portion of the plurality of credits;
    decrementing, in response to transmitting the first message, a credit balance of the first sender by one;
    determining that the credit balance of the first sender is zero;
    sending to a second sender of the plurality of senders, by the first sender, in response to the credit balance being zero, a first request for a second credit;
    receiving from the second sender, in response to the first request, a first response comprising the second credit; and
    transmitting, by the first sender, a second message to the receiver using the second credit.

2. The method of claim 1, further comprising:
    determining, after transmitting the second message, that the credit balance of the first sender is zero;
    sending a second request to the second sender for a third credit;
    sending, by the second sender after determining that the second sender has no credits available to share, the second request to a third sender of the plurality of senders;
    receiving, by the first sender, a second response from the third sender comprising the third credit; and
    transmitting a third message to the receiver using the third credit.

3. The method of claim 1, further comprising incrementing the credit balance of the first sender when the second credit is received.

4. The method of claim 3, wherein the first sender comprises a counter storing the credit balance.

5. The method of claim 1, further comprising:
receiving from the first sender, by the second sender, a second request for a third credit;
determining, by performing a test, that the second sender does not have the third credit available to share;
sending the second request to a third sender in response to the test.

6. The method of claim 5, wherein the test comprises comparing a credit balance of the second sender with minimum threshold.

7. The method of claim 5, wherein: (i) the second sender is in communication with the receiver when the second request is received, and (ii) the test comprises comparing a credit balance of the second sender with a pre-defined available quantity of credits.

8. The method of claim 5, wherein the first sender, the second sender, and the third sender are connect by a ring network.

9. The method of claim 1, wherein the portions of the plurality of credits are allocated to each of the plurality of senders based on a sender rank, and wherein a larger portion of the plurality of credits is allocated to the first sender than to the second sender based on the first sender having a higher sender rank than the second sender.

10. The method of claim 1, wherein the receiver comprises a buffer comprising a plurality of buffer slots, and further comprising:
storing, by the receiver, the first message in a buffer slot of the plurality of buffer slots;
processing by the receiver, after storing the first message in the buffer slot, the first message;
returning to the first sender, by the receiver, the first credit in response to processing the first message.

11. A system for dynamic flow control using credit sharing comprising:
a receiver comprising a buffer comprising a plurality of buffer slots for storing messages;
a plurality of credits corresponding to the plurality of buffer slots;
a first sender operatively connected to the receiver and configured to receive an allocation of a first portion of the plurality of credits;
a second sender operatively connected to the receiver and the first sender and configured to:
receive an allocation of a second portion of the plurality of credits;
transmit a first message to the receiver using a first credit of the second portion;
decrement, in response to transmitting the first message, a credit balance of the second sender;
determine that the credit balance of the second sender is zero;
send, in response to the credit balance being zero, a first request to the first sender for a second credit;
receive, in response to the first request, a first response from the first sender comprising the second credit; and
transmit a second message to the receiver using the second credit; and
a sender network operatively connecting the first sender and the second sender.

12. The system of claim 11, wherein:
the second sender is further configured to:
determine, after transmitting the second message, that the credit balance of the second sender is zero;
send a second request to the first sender for a third credit;
receive from a third sender a second response comprising the third credit; and
the first sender is further configured to:
send, after receiving the second request and determining that the first sender has no credits available to share, the second request to the third sender.

13. The system of claim 11, further comprising a counter storing the credit balance of the second sender, wherein the counter is incremented when the second credit is received.

14. The system of claim 11, wherein the first sender is further configured to:
receive from the second sender a second request for a third credit;
determine, by performing a test, that the first sender does not have the third credit available to share;
sending the second request to a third sender in response to the test.

15. The system of claim 14, wherein the test comprises comparing a credit balance of the first sender with a minimum threshold.

16. The system of claim 14, wherein: (i) the first sender is in communication with the receiver when the second request is received, and (ii) the test comprises performing a determination that the second sender does not comprise more than an active-communication threshold of the plurality of credits.

17. The system of claim 14, wherein the sender network is a ring network.

18. The system of claim 11, wherein the first sender and the receiver communicate via a network on a chip (NOC), and wherein the first message is a packet.

19. The system of claim 11, wherein the receiver is configured to:
store the first message in a buffer slot of the plurality of buffer slots;
process, after storing the first message in the buffer slot, the first message;
return the first credit to the first sender in response to processing the first message.

20. A system for dynamic flow control using credit sharing, comprising:
a first receiver comprising a first buffer storing a first message;
a second receiver comprising a second buffer storing a second message;
a first sender comprising:
a first counter storing a credit balance for the first receiver, wherein the first counter decrements in response to the first sender sending the first message to the first receiver, and
a second counter storing a credit balance for the second receiver, wherein the second counter decrements in response to the first sender sending the second message to the second receiver;
a second sender operatively connected to the first receiver and the second receiver and configured to give a plurality of credits for the first receiver to the first sender; and
a sender network for sharing the plurality of credits between the second sender and the first sender,
wherein the first counter increments in response to the first sender receiving the plurality of credits.

* * * * *

UNITED STATES PATENT AND TRADEMARK OFFICE
CERTIFICATE OF CORRECTION

PATENT NO. : 9,571,408 B2
APPLICATION NO. : 14/638953
DATED : February 14, 2017
INVENTOR(S) : Aingaran et al.

It is certified that error appears in the above-identified patent and that said Letters Patent is hereby corrected as shown below:

In the Specification

In Column 2, Lines 49-59, delete "may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements." and insert the same on Column 2, Line 48, after "etc.)" as a continuation of the paragraph.

In Column 3, Line 8, delete "FIG.1" and insert -- FIG. 1 --, therefor.

In Column 10, Line 59, delete "FIG.5A," and insert -- FIG. 5A, --, therefor.

In Column 14, Line 3, delete "and or" and insert -- and/or --, therefor.

In the Claims

In Column 17, Line 9, in Claim 6, after "with" insert -- a --.

Signed and Sealed this
Fifteenth Day of August, 2017

Joseph Matal
*Performing the Functions and Duties of the
Under Secretary of Commerce for Intellectual Property and
Director of the United States Patent and Trademark Office*